(12) United States Patent
Dharmaraj et al.

(10) Patent No.: US 11,702,230 B2
(45) Date of Patent: Jul. 18, 2023

(54) NON-SEALING BERTHING SYSTEM FOR SPACECRAFT

(71) Applicant: The Boeing Company, Chicago, IL (US)

(72) Inventors: Raju Dharmaraj, League City, TX (US); Thomas L. Hoffman, Friendswood, TX (US)

(73) Assignee: The Boeing Company, Chicago, IL (US)

( * ) Notice: Subject to any disclaimer, the term of this patent is extended or adjusted under 35 U.S.C. 154(b) by 927 days.

(21) Appl. No.: 16/416,100

(22) Filed: May 17, 2019

(65) Prior Publication Data
US 2020/0361641 A1    Nov. 19, 2020

(51) Int. Cl.
*B64G 1/64* (2006.01)
*F16B 7/04* (2006.01)

(52) U.S. Cl.
CPC .............. *B64G 1/646* (2013.01); *F16B 7/042* (2013.01)

(58) Field of Classification Search
CPC . B64G 1/646; B64G 1/12; F16B 7/042; F16B 7/0413
See application file for complete search history.

(56) References Cited

U.S. PATENT DOCUMENTS

| | | | |
|---|---|---|---|
| 6,354,540 B1* | 3/2002 | Lewis | B64G 1/646 244/172.4 |
| 7,543,779 B1* | 6/2009 | Lewis | B64G 1/646 244/172.4 |
| 2004/0245405 A1* | 12/2004 | Tchoryk | B64G 1/646 244/172.4 |
| 2015/0266595 A1* | 9/2015 | Ghofranian | B64G 1/222 244/172.4 |
| 2015/0375667 A1* | 12/2015 | Ledford | B63B 25/00 410/67 |

OTHER PUBLICATIONS

McFatter et al., "NASA Docking System Block 1: NASA's New Direct Electric Docking System Supporting ISS and Future Human Space Exploration", 2018. (Year: 2018).*
W.H.GERSTENMAIER et al., International Docking System Standard (IDSS) Interface Definition Document (IDD): Revision E; Oct. 2016.

* cited by examiner

*Primary Examiner* — Andrew Schechter
*Assistant Examiner* — Jeremy A Delozier
(74) *Attorney, Agent, or Firm* — Duft & Bornsen, PC

(57) ABSTRACT

Berthing systems for visiting spacecraft and associated methods. In one embodiment, a non-sealing berthing system includes a tunnel having an interface surface that mates with a docking system of a target spacecraft. The berthing system further includes sliding hooks disposed circumferentially on the interface surface of the tunnel, preload members disposed circumferentially at the interface surface of the tunnel and configured to extend and retract from the interface surface in an axial direction, guide petals spaced around an inner peripheral surface of the tunnel, and soft capture petals spaced around the inner peripheral surface of the tunnel. The soft capture petals include capture latches configured to engage mechanical latch strikers on the docking system of the target spacecraft.

20 Claims, 17 Drawing Sheets

FIG. 15
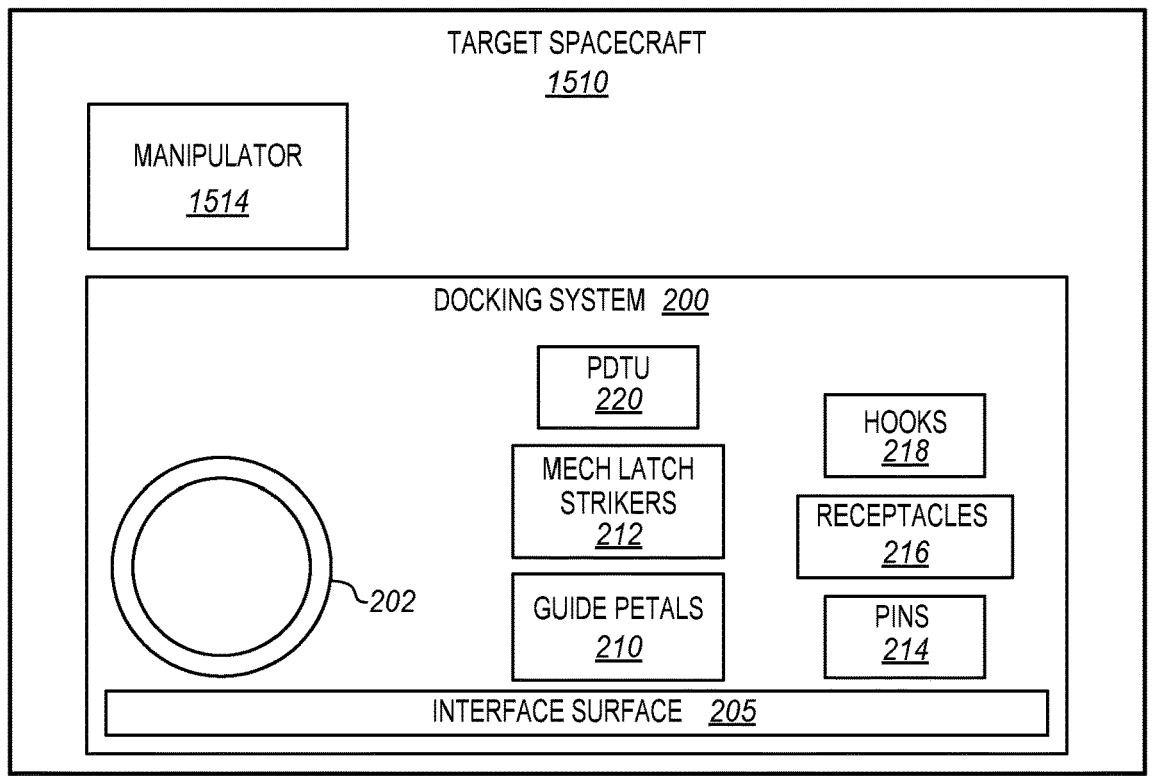
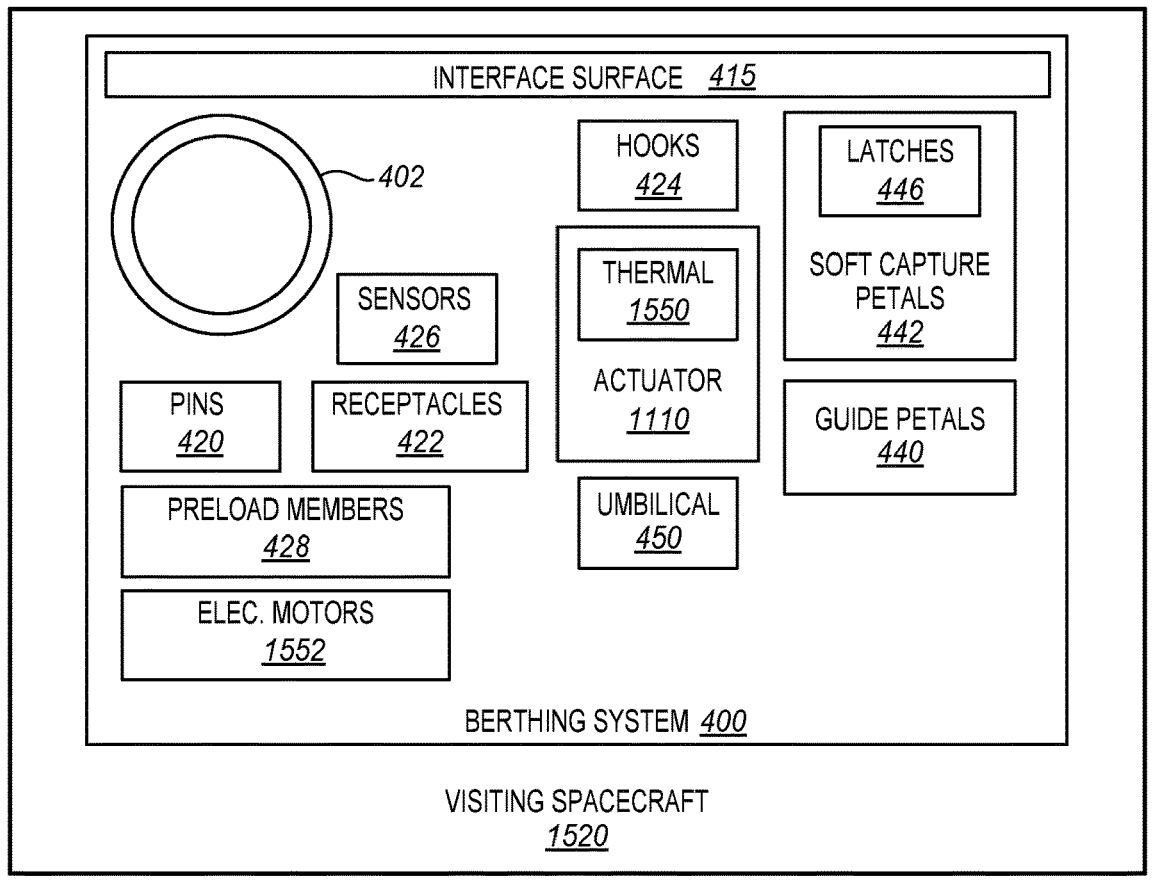

NON-SEALING BERTHING SYSTEM FOR SPACECRAFT

FIELD

This disclosure relates to the field of spacecraft, and more particularly, to attaching a visiting spacecraft to a target spacecraft.

BACKGROUND

A space station, such as the International Space Station (ISS), is a large spacecraft that orbits the Earth. The ISS is an example of a target spacecraft equipped with docking ports that support crewed and un-crewed docking of visiting spacecraft. The International Docking System Standard Interface Definition Document (IDSS IDD) is an international standard that defines the interface parameters used by docking mechanisms, which is incorporated by reference as if fully included herein. The docking systems are designed to be either active mating systems, meaning that they are equipped with actively controlled elements used in the docking process, or as passive mating systems that receive the active mating systems. An IDSS-compliant active docking system may be installed on the visiting spacecraft or "chaser vehicle", and a corresponding IDSS-compliant passive docking system is installed on a port of the target spacecraft or "target vehicle", to form a mating system. The National Aeronautics and Space Administration (NASA) has developed the NASA Docking System (NDS) as an IDSS-compliant active docking system. For example, the NDS active docking system uses a soft capture ring to extend and latch onto an adjacent passive docking system on the target spacecraft for a soft capture. The soft capture ring is then retracted to pull the visiting spacecraft towards the docking system on the target spacecraft where mating surfaces come into contact. Structural hooks on the active docking system are then commanded to join with passive hooks on the passive docking system providing a structural connection ready for pressurization between the mated spacecraft that allows for cargo and crew transfer.

The IDSS standard does not preclude docking systems from being used as "berthing" mating systems. Unlike a docking operation where capture is achieved through physical contact due to relative motion of one vehicle against another (i.e., collision), berthing takes place when a visiting spacecraft enters the vicinity of a target spacecraft, commonly referred to as a "berthing box", and maintains a holding pattern. At this point, a station arm or similar manipulator device grasps the visiting spacecraft and brings the visiting spacecraft in position near the target spacecraft. A capture device, usually located on the active system, latches onto the target and the mating continues until the final structural connection is achieved.

SUMMARY

Described herein is a non-sealing berthing system for a visiting spacecraft configured to mate with a docking system on a target spacecraft. Berthing is a mating operation between spacecraft where the visiting spacecraft is placed into the mating interface with a manipulator, such as a robot arm. There may be situations where a visiting spacecraft does not need a pressurized connection with the target spacecraft, such as when temporarily parking the visiting spacecraft at the target spacecraft. In situations such as this, a non-sealing berthing system as described herein may be implemented on the visiting spacecraft in place of a sealing berthing system or a docking system (which is also sealed via hard capture). A berthing operation for the non-sealing berthing system is assisted by the manipulator on the target spacecraft that grasps the visiting spacecraft, and positions the visiting spacecraft with the non-sealing berthing system facing the docking system of the target spacecraft. The non-sealing berthing system is then mated to the docking system of the target spacecraft without a pressurized seal. Although NDS-compliant docking systems are effective for their intended purpose, a non-sealing berthing system as described herein may have reduced weight, is easily manufactured, and has less complexity. Thus, the non-sealing berthing system may be installed on a wide range of visiting spacecraft.

One embodiment comprises a non-sealing berthing system for a visiting spacecraft. The non-sealing berthing system includes a tunnel having a first end configured to attach to the visiting spacecraft, and a second end that includes an interface surface that mates with a docking system of a target spacecraft. The non-sealing berthing system further includes sliding hooks disposed circumferentially on the interface surface of the tunnel, and preload members disposed circumferentially at the interface surface of the tunnel, and configured to extend and retract from the interface surface in an axial direction. The non-sealing berthing system further includes guide petals spaced around an inner peripheral surface of the tunnel, where the guide petals project in the axial direction beyond the interface surface and point radially inward. The non-sealing berthing system further includes soft capture petals spaced around the inner peripheral surface of the tunnel, where the soft capture petals project in the axial direction beyond the interface surface and point radially inward. The soft capture petals include capture latches configured to engage mechanical latch strikers on the docking system of the target spacecraft.

In another embodiment, the capture latches comprise ball plungers.

In another embodiment, the soft capture petals include a contact surface that angles radially inward at 45 degrees, and one of the ball plungers is disposed on the contact surface.

In another embodiment, the non-sealing berthing system further includes guide pins that project in the axial direction from the interface surface of the tunnel, and guide pin receptacles recessed in the axial direction from the interface surface.

In another embodiment, the non-sealing berthing system further includes unberthing complete sensors disposed at the guide pin receptacles, and configured to indicate when guide pins on the docking system of the target spacecraft disengage from the guide pin receptacles.

In another embodiment, the non-sealing berthing system further includes hook engagement sensors at the interface surface configured to indicate contact with the docking system of the target spacecraft.

In another embodiment, the non-sealing berthing system further includes clutch-loaded electric motors coupled to the preload members, and configured to move the preload members in the axial direction.

In another embodiment, the sliding hooks are part of a hook assembly comprising a housing mounted on the tunnel, one of the sliding hooks that is slidably coupled to the housing, and an elastic member configured to apply a force on the one of the sliding hooks in a first tangential direction with respect to the interface surface.

In another embodiment, the hook assembly further comprises a thermal actuator configured to apply a force on the one of the sliding hooks in a second tangential direction with respect to the interface surface.

In another embodiment, the hook assembly further comprises a hand release knob coupled to the one of the sliding hooks, and configured to move the one of the sliding hooks in a second tangential direction.

In another embodiment, a pair of the guide petals and one of the soft capture petals are mounted within groupings along the inner peripheral surface of the tunnel, with the one of the soft capture petals interposed between the pair of the guide petals at each of the groupings.

Another embodiment comprises a non-sealing berthing system for a visiting spacecraft. The non-sealing berthing system includes a tunnel having a first end configured to attach to the visiting spacecraft, and a second end that includes an interface surface that mates with a docking system of a target spacecraft. The non-sealing berthing system further includes guide pins that project axially from the interface surface of the tunnel, guide pin receptacles recessed from the interface surface, soft capture petals spaced equally around an inner peripheral surface of the tunnel and that project axially beyond the interface surface and point radially inward, and guide petals attached to the inner peripheral surface of the tunnel. The soft capture petals are each disposed between a pair of the guide petals. The non-sealing berthing system further includes sliding hooks disposed circumferentially on the interface surface of the tunnel, and configured to engage passive hooks on the docking system of the target spacecraft to form hook engagements. The non-sealing berthing system further includes preload members disposed circumferentially at the interface surface of the tunnel, and configured to extend axially to contact the docking system of the target spacecraft and exert tension on the hook engagements. The soft capture petals include capture latches configured to engage mechanical latch strikers on the docking system of the target spacecraft.

In another embodiment, the capture latches comprise ball plungers.

In another embodiment, the non-sealing berthing system further includes clutch-loaded electric motors coupled to the preload members, and configured to extend the preload members axially.

In another embodiment, the sliding hooks are part of a hook assembly comprising a housing mounted on the tunnel, one of the sliding hooks that is slidably coupled to the housing, and an elastic member configured to apply a force on the one of the sliding hooks in a first tangential direction with respect to the interface surface, and a thermal actuator configured to apply a force on the one of the sliding hooks in a second tangential direction with respect to the interface surface.

In another embodiment, the hook assembly further comprises a hand release knob coupled to the one of the sliding hooks, and configured to move the one of the sliding hooks in a second tangential direction.

Another embodiment comprises a method for berthing a visiting spacecraft. The method includes navigating the visiting spacecraft to an initial position adjacent to a target spacecraft, grasping the visiting spacecraft with a manipulator on the target spacecraft, maneuvering the visiting spacecraft with the manipulator so that a berthing system of the visiting spacecraft is aligned with a docking system of the target spacecraft, moving the visiting spacecraft with the manipulator toward the target spacecraft using guide petals of the berthing system for course alignment, moving the visiting spacecraft with the manipulator toward the target spacecraft to a mating position using guide pins and guide pin receptacles on the berthing system for final alignment, engaging capture latches on soft capture petals of the berthing system with mechanical latch strikers on the docking system of the target spacecraft at the mating position, engaging sliding hooks on the berthing system with hooks on the docking system of the target spacecraft to form hook engagements at the mating position, generating an indicator of the hook engagements via hook engagement sensors at an interface surface of the berthing system, and applying an axial force with preload members on the berthing system to exert tension on the hook engagements in response to the indicator.

In another embodiment, unberthing the visiting spacecraft comprises removing the tension on the hook engagements via the preload members, disengaging the sliding hooks on the berthing system from the hooks on the docking system of the target spacecraft, moving the visiting spacecraft away from the target spacecraft with the manipulator, disengaging the capture latches on the soft capture petals of the berthing system from the mechanical latch strikers on the docking system due to movement of the visiting spacecraft, generating indicators when guide pins on the docking system of the target spacecraft disengage from the guide pin receptacles on the berthing system, and releasing the visiting spacecraft from the manipulator.

In another embodiment, disengaging the sliding hooks on the berthing system from the hooks on the docking system of the target spacecraft comprises activating thermal actuators to slide the sliding hooks and disengage the sliding hooks from the hooks on the docking system of the target spacecraft.

In another embodiment, disengaging the sliding hooks on the berthing system from the hooks on the docking system of the target spacecraft comprises operating hand release knobs to slide the sliding hooks and disengage the sliding hooks from the hooks on the docking system of the target spacecraft.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present invention are now described, by way of example only, with reference to the accompanying drawings. The same reference number represents the same element or the same type of element on all drawings.

FIG. 15 is a block diagram of a target spacecraft and a visiting spacecraft in an illustrative embodiment.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1:
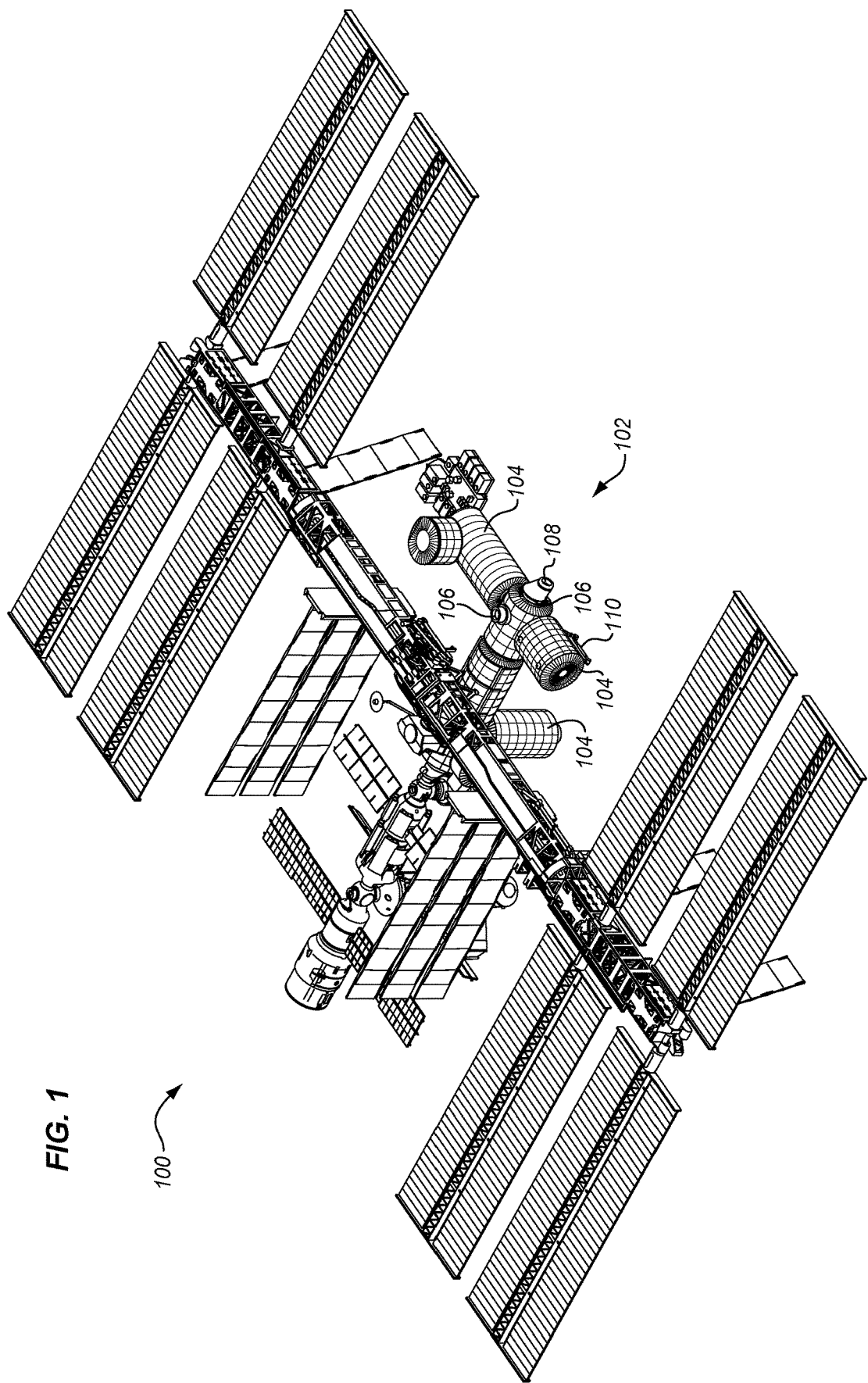
FIG. 1 is a perspective view of the International Space Station (ISS).

FIG. 1 is a perspective view of the ISS 100. One segment of ISS 100 is referred to as the US Orbital Segment (USOS) 102, which refers to the components constructed by NASA and other cooperating agencies. USOS 102 includes multiple modules 104, which are pressurized segments of USOS 102 that may be habitable. Some modules 104 are referred to as "nodes", such as Unity, Harmony, and Tranquility. Other modules 104 are laboratories, such as Density, Columbus, and Kibo. The modules 104 of USOS 102 have one or more Common Berthing Mechanisms (CBMs) 106, which are berthing mechanisms used to connect pressurized elements. For example, the Unity, Harmony, and Tranquility nodes have four CBMs 106 around their exterior, and one CBM 106 on each end. The CBMs 106 may be used to connect one module 104 to another. Also, one or more CBMs 106 may be converted into a docking port so that a visiting spacecraft (also referred to as a Visiting Vehicle (VV)) may park at the module 104.

To convert a CBM 106 into a docking port, a Pressurized Mating Adapter (PMA) 108 may be installed at the CBM 106. A PMA 108 is a spacecraft adapter that converts a CBM 106 into an Androgynous Peripheral Attach System (APAS) docking port. For example, PMA-1 is mounted to a CBM 106 on the Unity node, and PMA-2 and PMA-3 are mounted to CBMs 106 on the Harmony node (although the locations of the PMAs 108 may change over time). The IDSS has been adopted to replace APAS as the standard for docking with USOS 102. Thus, an NDS-compliant docking system or docking adapter may be attached to a PMA 108 to convert PMA 108 to an IDSS docking port. For example, the International Docking Adapter (IDA) is a spacecraft docking system adapter developed to convert APAS to the NDS/IDSS. An IDA may therefore be attached to a PMA 108 to form an IDSS docking port. Also, another NDS-compliant docking system may be attached to a CBM 106 or an intermediate adapter to form a docking port.

Figure 2:
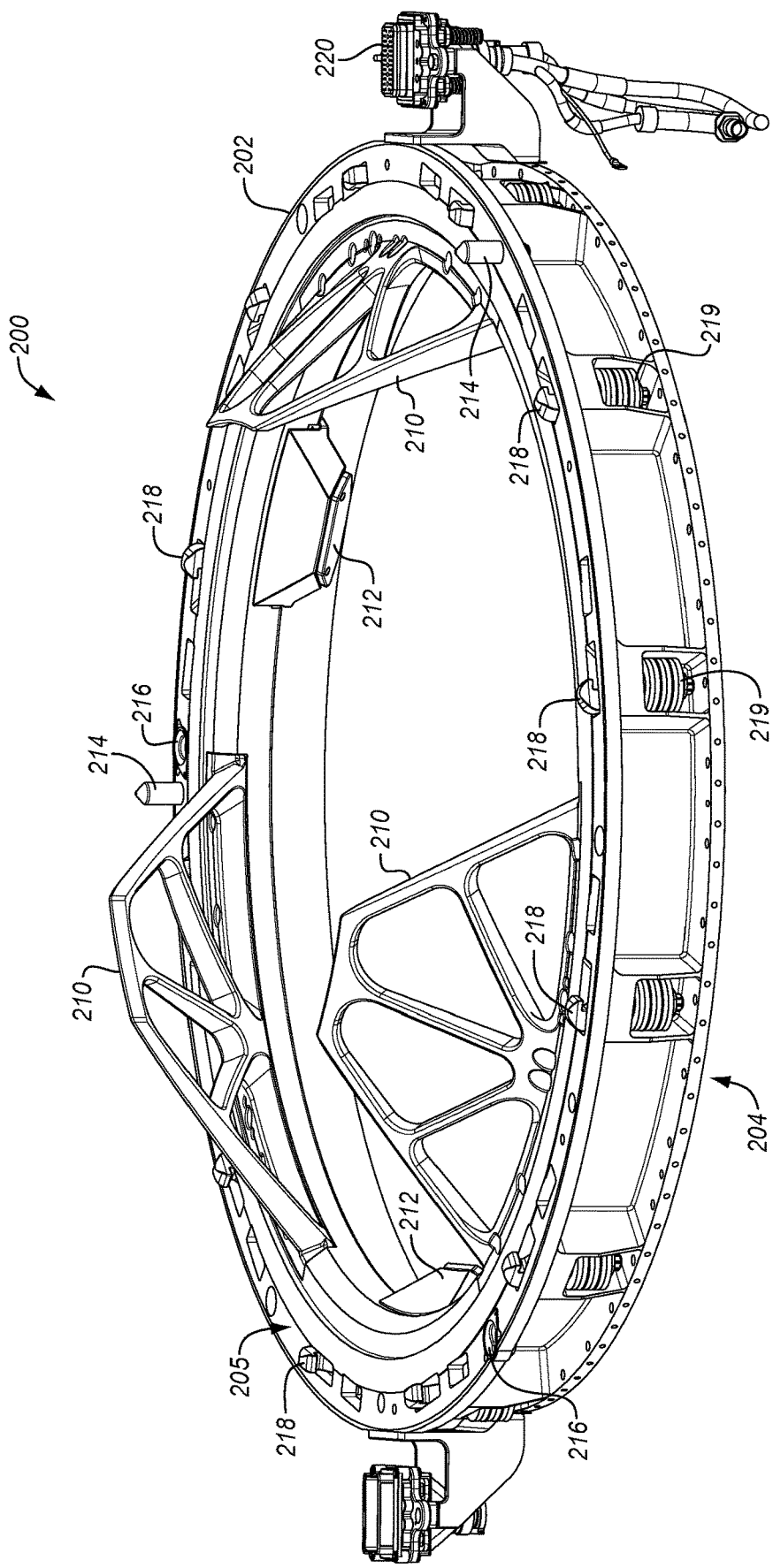
FIG. 2 is a perspective view of an NDS-compliant docking system on a target spacecraft.

FIG. 2 is a perspective view of an NDS-compliant docking system 200. Docking system 200 is installed on a target spacecraft (e.g., ISS 100), and is configured to mate with a corresponding NDS-compliant system on a visiting spacecraft. The term "docking system" as used herein refers to a mechanical or electromechanical device that facilitates the connection of one type of docking or berthing interface to a different interface. Thus, docking system 200 is configured for docking or berthing operations. One example of docking system 200 is an NDS Block 2 passive system. Although not illustrated in FIG. 2, another example of docking system 200 may be an IDA or another NDS-compliant system.

Docking system 200 includes a tunnel 202, which is generally a cylindrical structure having opposing interface surfaces 204-205. Interface surface 204 is configured to mate with a corresponding interface surface on the target spacecraft, such as on a CBM 106, a PMA 108, or another element. Interface surface 205 is configured to mate with a corresponding interface surface on a docking/berthing system on a visiting spacecraft. Docking system 200 further includes guide petals 210, mechanical latch strikers 212, guide pins 214, guide pin receptacles 216, hooks 218, and resource umbilicals (i.e., Power/Data Transfer Umbilical (PDTU) 220). There are three guide petals 210 connected to tunnel 202 that are equally spaced around an inner peripheral surface of tunnel 202. Guide petals 210 project axially beyond interface surface 205 and point radially inward. Guide petals 210 are the first elements of docking system 200 to make contact (i.e., initial contact) with a docking/berthing system on a visiting spacecraft. Mechanical latch strikers 212 are also spaced around the inner peripheral surface of tunnel 202 between guide petals 210. The term "striker" refers to the area on the passive side of a mating interface which is intended to be a contact surface for an active component on the active side of the mating interface. Thus, mechanical latch strikers 212 are the contact surface for a capture latch of a docking/berthing system on a visiting spacecraft. Guide pins 214 and guide pin receptacles 216 are disposed on interface surface 205, and provide alignment of docking system 200 with a docking/berthing system on a visiting spacecraft. Hooks 218 provide the structural connection between docking system 200 and a docking/berthing system on a visiting spacecraft. In FIG. 2, docking system 200 includes twelve passive hooks 218. Each hook 218 includes a pyrotechnic bolt 219 or another pyrotechnic mechanism configured to lease hook 218 for contingency undocking or unberthing. Other configurations of docking system 200 may include active hooks or active/passive hook pairs. PDTUs 220 are configured to mate with resource umbilicals on a docking/berthing system on a visiting spacecraft to transfer power, data, etc. Docking system 200 includes more components that not described for the sake of brevity, such as sensors, sensor strikers, reflector targets, docking targets, etc.

Figure 3:
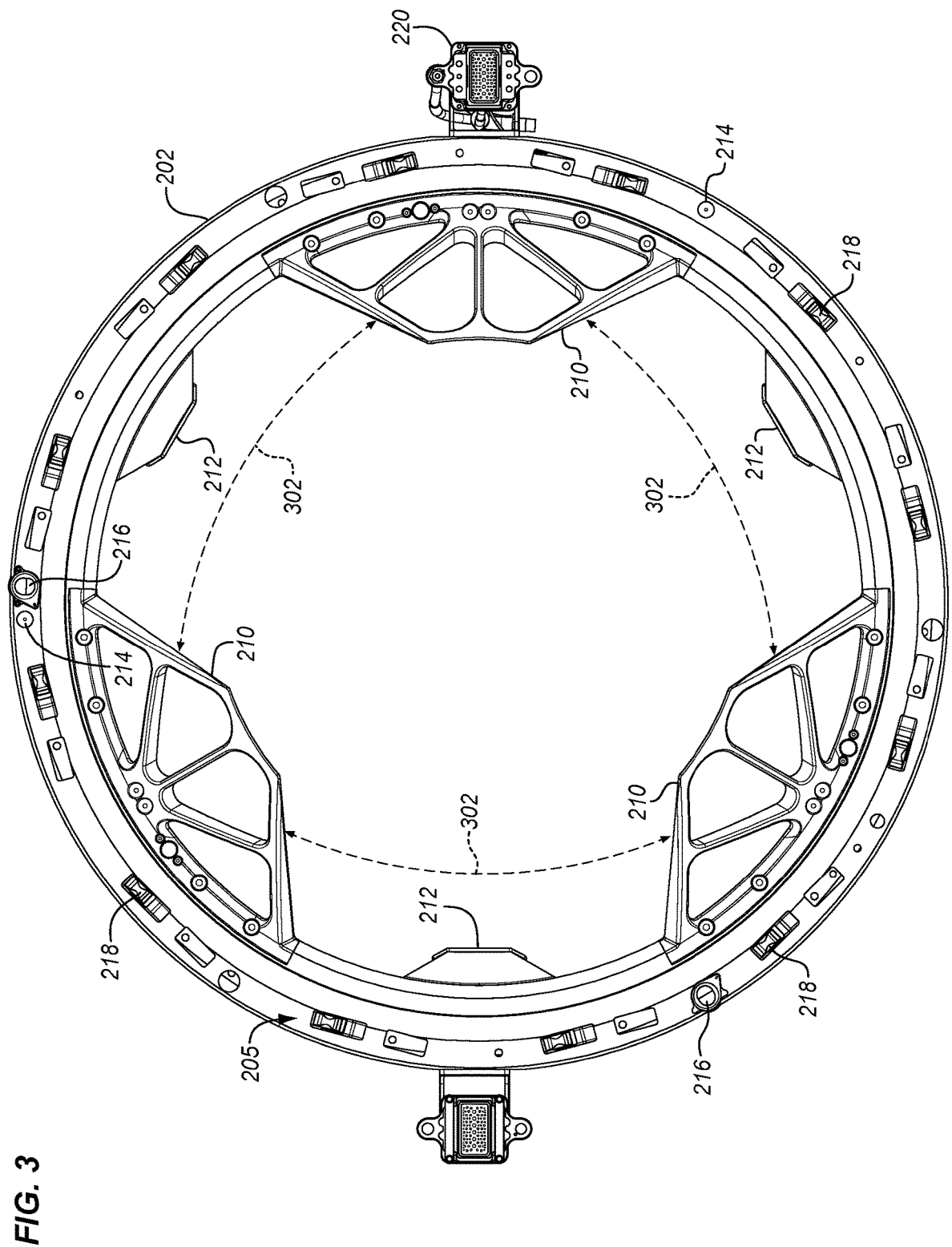
FIG. 3 is a plan view of a docking system on a target spacecraft.

FIG. 3 is a plan view of docking system 200. The view in FIG. 3 is from interface surface 205, which faces toward a docking/berthing system on a visiting spacecraft. This view further illustrates the configuration of guide petals 210 and mechanical latch strikers 212. As described above, guide petals 210 are equally spaced around the inner peripheral surface of tunnel 202. Thus, there are circumferential gaps 302 between guide petals 210. Mechanical latch strikers 212 are spaced around the inner peripheral surface of tunnel 202 in the circumferential gaps 302 between guide petals 210.

Docking system 200 may allow for both docking and berthing operations. A docking operation is a process of connecting spacecraft without external assistance. In the case of docking, a Guidance, Navigation and Control (GN&C) system of the visiting spacecraft controls the entry of the visiting spacecraft into the docking system on the target spacecraft for capture. A berthing operation is a process of connecting spacecraft with assistance. In the case of berthing, the GN&C system navigates the visiting spacecraft to a meeting point, and a manipulator (i.e., a mechanical robot arm 110 on ISS 100 as shown in FIG. 1) on the target spacecraft grasps the visiting spacecraft and transfers it to the final position for capture.

To perform a docking operation, for example, the visiting spacecraft has an active docking system that mates with docking system 200 on the target spacecraft. One example of an active docking system is NDSB1. An active docking system is divided into two subsystems: an active Soft Capture System (SCS) that extends axially outward to attach with docking system 200, and a Hard Capture System (HCS). In the first stage of a docking operation, the active SCS establishes the initial (soft) capture of the visiting spacecraft and provides load attenuation. The active SCS generally includes an SCS ring, guide petals with capture latches attached to the SCS ring, and a Linear Actuator System (LAS). The LAS extends the SCS ring to align the guide petals with docking system 200, and the capture latches on the guide petals lock the SCS ring to the mechanical latch strikers 212 on docking system 200. When the soft capture is complete and after load attenuation, the LAS retracts the SCS ring to initiate the second stage of docking performed by the HCS. The HCS generally includes an HCS ring, pressure seals, guide pins/guide pin receptacles, hook pairs, etc. When the SCS ring is retracted, the docking spacecraft are pulled together until an interface surface of the active docking system on the visiting spacecraft contacts the interface surface 205 of docking system 200. The HCS performs structural latching and sealing between the active docking system and docking system 200 in order to transfer structural loads between the visiting spacecraft and the target spacecraft, and to create a transfer tunnel which can be pressurized for crew and cargo transfer.

Figure 4:
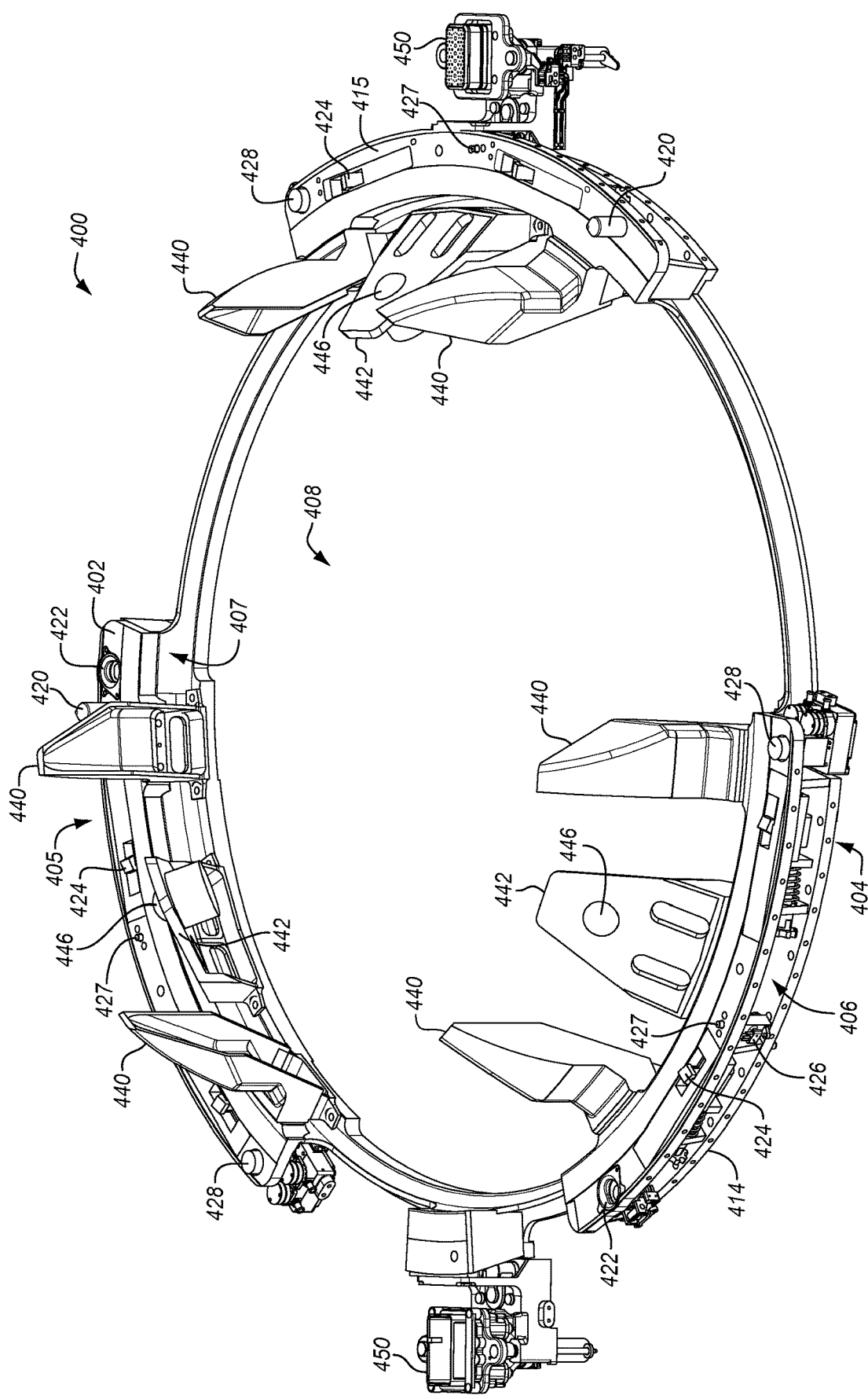
FIG. 4 is a perspective view of a berthing system in an illustrative embodiment.

In the embodiments described herein, a non-sealing berthing system is disclosed for a visiting spacecraft. FIG. 4 is a perspective view of berthing system 400 in an illustrative embodiment. Berthing system 400 (also referred to as a berthing mechanism) is an NDS-compliant mechanical or electromechanical device that facilitates a connection of a visiting spacecraft to docking system 200, such as an NDS Block 2 passive system. However, it is understood that berthing system 400 may be configured to mate with future generations of NDS-compliant dockings systems or docking adapters, such as IDA. Berthing system 400 is configured for berthing/unberthing operations that are assisted by a manipulator, which may be referred to as manipulator-assisted berthing and unberthing. The manipulator may comprise the ISS Space Station Remote Manipulator System (SSRMS), which is illustrated by mechanical robot arm 110, or a similar future manipulator system.

Berthing system 400 includes a tunnel 402, which is the main housing of berthing system 400 for structural mating. Tunnel 402 is generally a cylindrically-shaped or annular member having opposing ends 404-405 in the axial direction, an outer peripheral surface 406 and an inner peripheral surface 407 in the radial direction, and a passageway, hollow, hole, or opening 408 bounded by inner peripheral surface 407. Tunnel 402 is made or machined from a rigid material having stiffness and hardness comparable to that of metal alloys commonly used in aerospace vehicle primary structures, such as Aluminum (e.g., a 6061 Aluminum alloy). Because berthing system 400 is configured for berthing instead of docking, berthing system 400 includes a single ring (i.e., tunnel 402) and does not implement an additional SCS ring and actuators as with an active docking system (e.g., NDSB1).

End 404 represents the end of berthing system 400 that faces a visiting spacecraft, and includes an interface surface 414 that attaches to a port on the visiting spacecraft. End 405 represents the end of berthing system 400 that mates with docking system 200 on a target spacecraft. Mating as described herein for berthing system 400 refers to a structural latching without sealing. End 405 includes an interface surface 415 that is generally flat. A variety of components are disposed circumferentially on interface surface 415 for alignment and mating. For instance, guide pins 420 and guide pin receptacles 422 are disposed on interface surface 415. Guide pins 420 project in the axial direction from interface surface 415, and guide pin receptacles 422 are recessed in the axial direction from interface surface 415. Guide pins 420 are configured to mate with corresponding guide pin receptacles 216 on docking system 200 (see FIG. 2). Likewise, guide pin receptacles 422 are configured to mate with corresponding guide pins 214 on docking system 200 (see FIG. 2). Guide pins 420 and guide pin receptacles 422 are final alignment features for a berthing operation. Hooks 424 are also disposed circumferentially on interface surface 415, and may project at least partially from a slot in interface surface 415. Hooks 424 are configured to engage with corresponding hooks 218 on docking system 200 to provide structural latching.

One or more hook engagement sensors 426 may also be disposed circumferentially at interface surface 415. Hook engagement sensors 426 are configured to indicate contact with docking system 200. Hook engagement sensors 426 include a sensor rod 427 that projects axially from interface surface 415, and is configured to be compressed by force from an opposing interface surface 205 of docking system 200 (see FIG. 2). Hook engagement sensors 426 generate a signal or indicator when sensor rod 427 is compressed due to contact with docking system 200. As will be described in more detail below, hooks 424 automatically engage the corresponding hooks 218 on docking system 200 when interface surface 415 of berthing system 400 contacts or nearly contacts interface surface 205 of docking system 200. Thus, when sensor rods 427 are compressed due to contact with docking system 200, signals from hook engagement sensors 426 may be used to indicate that hooks 424 are engaged with corresponding hooks 218 on docking system 200.

One or more preload members 428 may also be disposed circumferentially at interface surface 415. Preload members 428 are configured to extend and retract axially from interface surface 415. Preload members 428 are configured to extend from interface surface when hooks 424 are engaged with corresponding hooks 218 on docking system 200. When extended, preload members 428 make contact with interface surface 205 of docking system 200 and apply an axial force that acts to separate berthing system 400 from docking system 200. This axial force creates tension between hooks 424 on berthing system 400 and hooks 218 on docking system 200 to support their respective hook engagements.

Berthing system 400 further includes a plurality of guide petals 440 that are spaced around inner peripheral surface 407 of tunnel 402. Guide petals 440 project in the axial direction beyond interface surface 415, and generally point radially inward. Guide petals 440 are soft capture features that make initial contact with docking system 200. The locations and numbers of guide petals 440 shown in FIG. 4 is just an example, and may vary as desired. Guide petals 440 are fixedly mounted directly to tunnel 402 as opposed to being mounted on an extendible SCS ring of an active docking system.

Berthing system 400 further includes a plurality of soft capture petals 442 that are spaced around inner peripheral surface 407 of tunnel 402. Soft capture petals 442 project in the axial direction beyond interface surface 415, and generally point radially inward. Soft capture petals 442 are fixedly mounted directly to tunnel 402 as opposed to being mounted on an extendible SCS ring of an active docking system. Soft capture petals 442 include capture latches 446, which are a type of mechanical latch configured to engage the mechanical latch strikers 212 of docking system 200. Thus, the locations of soft capture petals 442 correspond with the locations of mechanical latch strikers 212 of docking system 200.

Berthing system 400 may further include one or more resource umbilicals 450 configured to engage with PDTU 220 on docking system 200. Resource umbilicals 450 are configured to transfer resources between two docked spacecraft. For example, resource umbilicals 450 may transfer power, data, and a ground safety wire. Resource umbilicals 450 may also transfer water, fuel, tank pressurization, etc.

Figure 5:
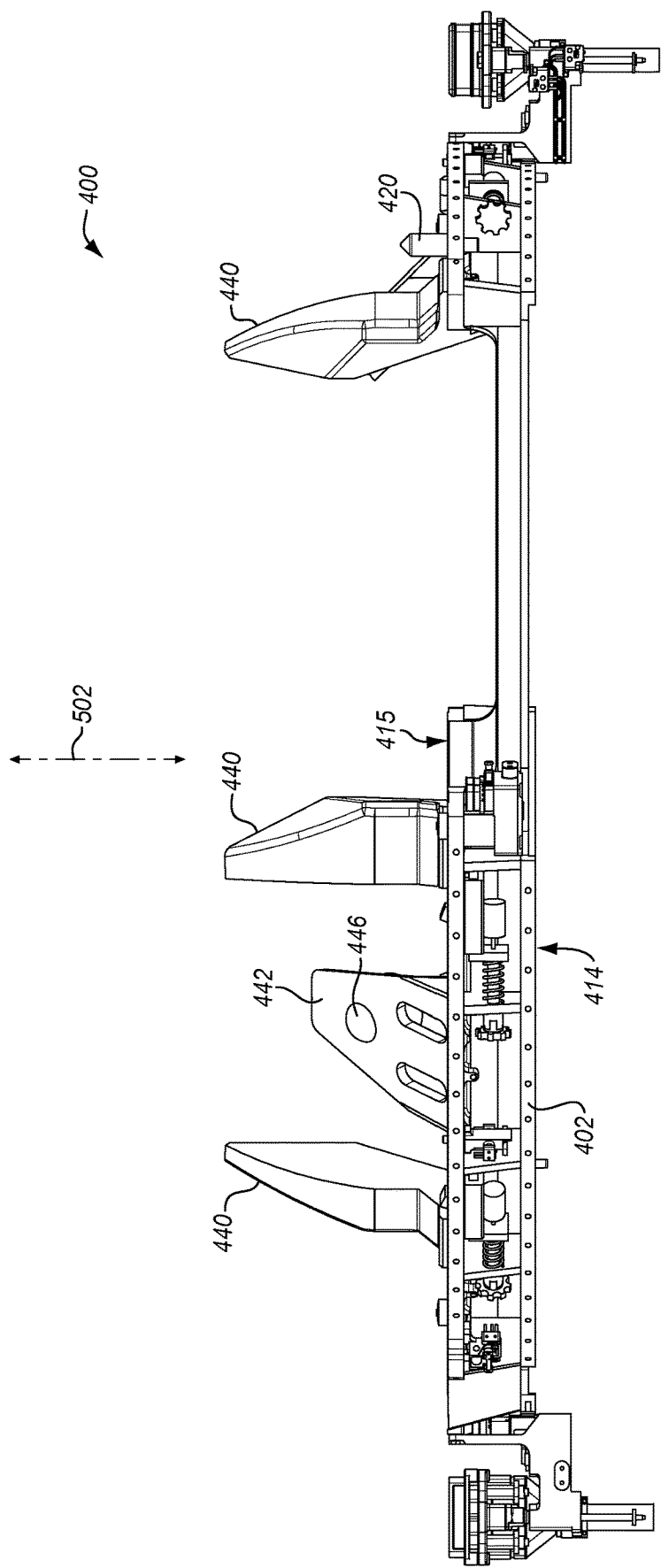
FIG. 5 is a side view of a berthing system in an illustrative embodiment.

FIG. 5 is a side view of berthing system 400 in an illustrative embodiment. As is evident in this figure, guide petals 440 project in the axial direction 502 beyond interface surface 415, and point radially inward. Soft capture petals 442 also project in the axial direction 502 beyond interface surface 415, and point radially inward. Guide petals 440 project further in the axial direction 502 than soft capture petals 442, as guide petals 440 act as course alignment guides for a berthing operation.

Figure 6:
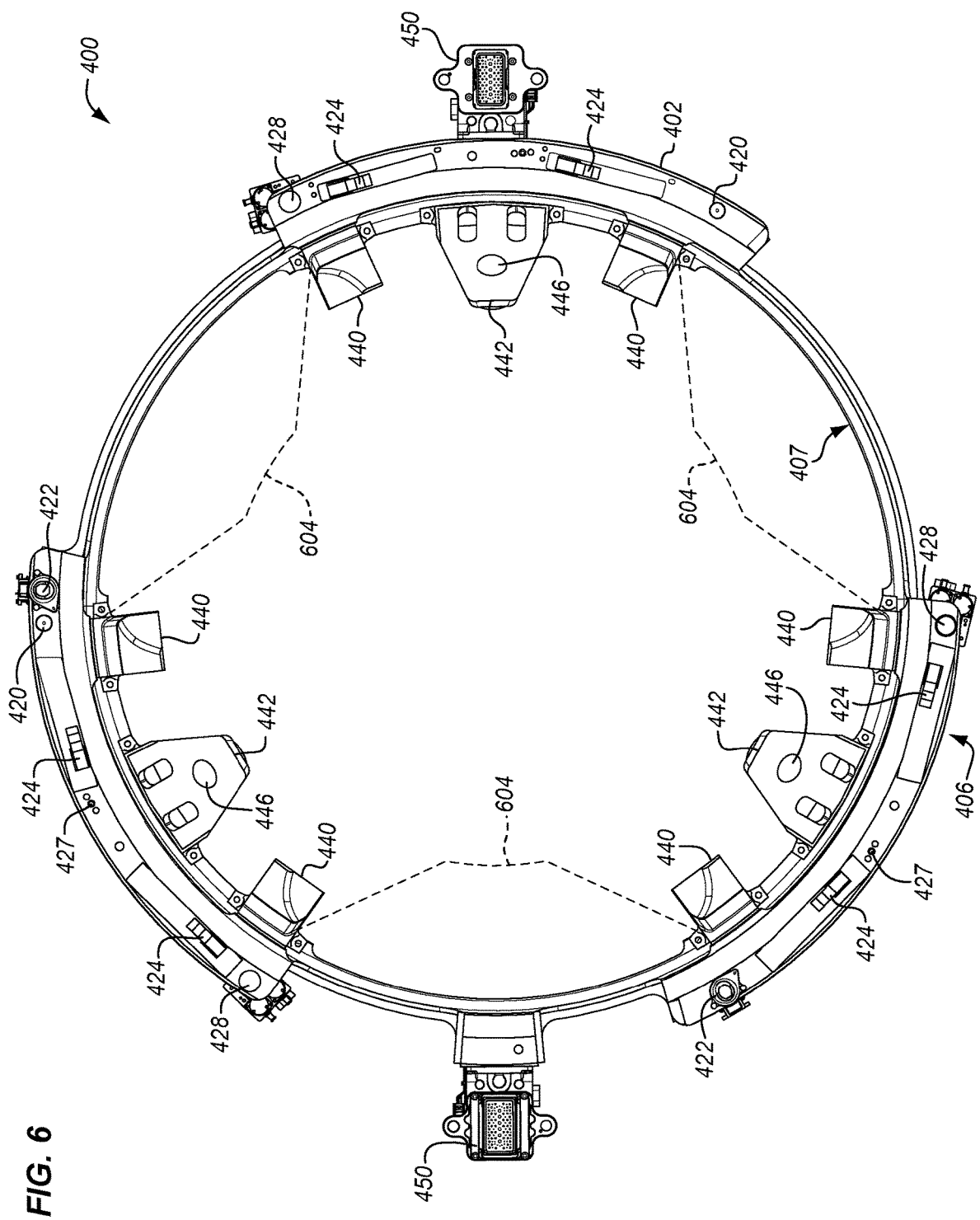
FIG. 6 is a plan view of a berthing system in an illustrative embodiment.

FIG. 6 is a plan view of berthing system 400 in an illustrative embodiment. The view in FIG. 6 is of interface surface 415, which faces toward docking system 200 in a berthing operation. This view shows guide petals 440 and soft capture petals 442 are spaced around inner peripheral surface 407 of tunnel 402. In one embodiment, one or more guide petals 440 and a soft capture petal 442 are arranged along inner peripheral surface 407. For example, a soft capture petal 442 may be interposed between a pair of guide petals 440 as a grouping. The locations of the groupings of guide petals 440 and soft capture petals 442 correspond with the circumferential gaps 302 between guide petals 210 of docking system 200. Thus, guide petals 440 and soft capture petals 442 of berthing system 400 do not interfere with guide petals 210 of docking system 200 (indicated by area 604) during a berthing operation.

Figure 7:
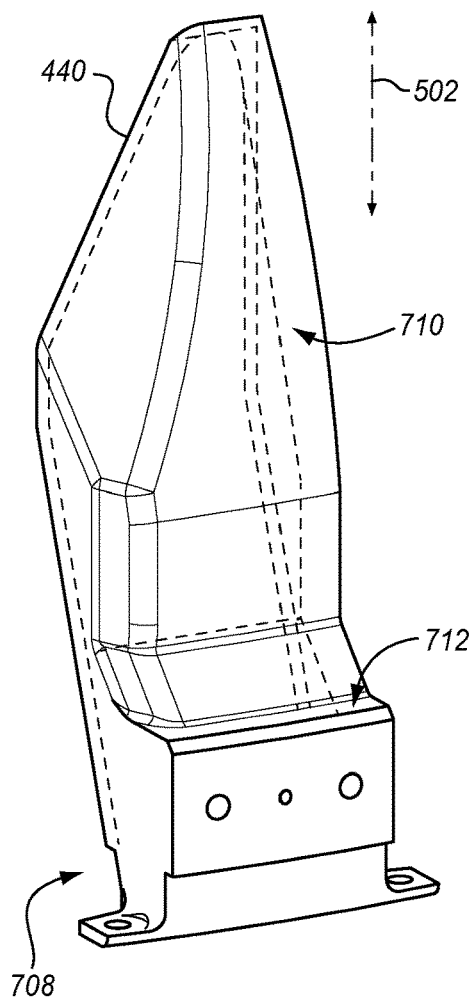
FIG. 7 is a perspective view of a guide petal in an illustrative embodiment.

FIG. 7 is a perspective view of a guide petal 440 in an illustrative embodiment. Guide petal 440 is an elongated member that includes a mounting portion 708, a contact surface 710, and a petal base 712. The structure of guide petal 440 may be derived from a Modified-APAS (MAPAS) guide petal, which is a proven technology used for mating operations. Mounting portion 708 is configured to attach to inner peripheral surface 407 of tunnel 402. For example, mounting portion 708 may be welded, bolted, or otherwise affixed to tunnel 402. Contact surface 710 is angled, contoured, curved, or otherwise shaped radially inward. The entirety of contact surface 710 is generally smooth so that docking system 200 and berthing system 400 may slide against each other to assist in initial alignment during soft capture. Guide petal 440 may be referred to as a passive guide petal, as no capture latches are implemented on contact surface 710 of guide petal 440. Contact surface 710 and guide petal 440 are configured for alignment, and do not include components for latching. Petal base 712 is a generally planar surface at the bottom side of contact surface 710.

Figure 8:
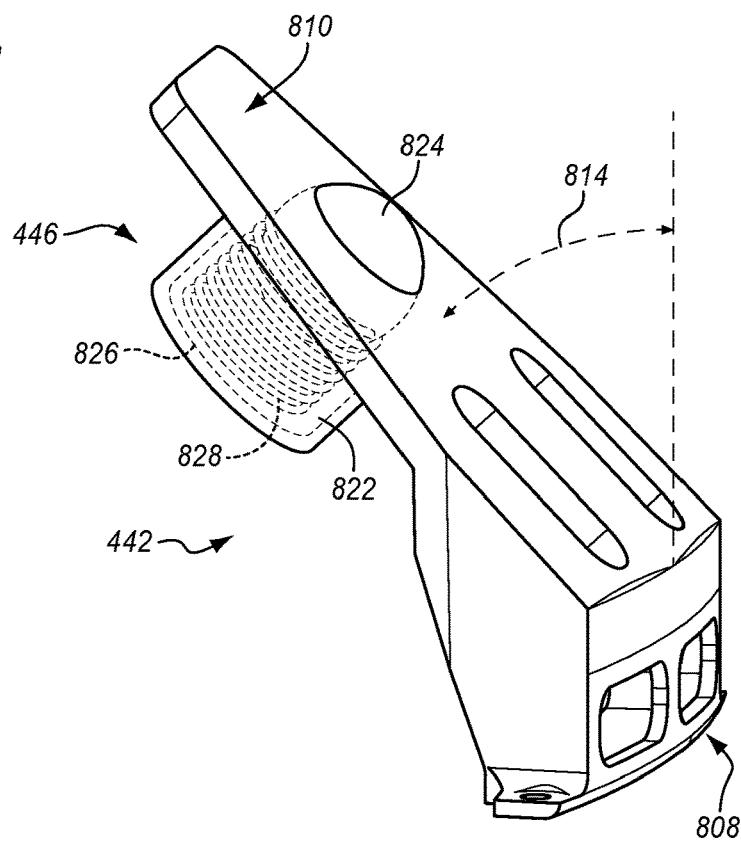
FIG. 8 is a side view of a soft capture petal in an illustrative embodiment.

FIG. 8 is a side view of a soft capture petal 442 in an illustrative embodiment. Soft capture petal 442 includes a mounting portion 808 and a contact surface 810. Mounting portion 808 is configured to attach to inner peripheral surface 407 of tunnel 402. For example, mounting portion 808 may be welded, bolted, or otherwise affixed to tunnel 402. Contact surface 810 is angled or otherwise shaped radially inward. For example, contact surface 810 may slant radially inward at an angle 814 of about 45 degrees. Capture latch 446 projects from contact surface 810, and is configured to engage a mechanical latch striker 212 of docking system 200. In one embodiment, capture latch 446 may comprise a ball plunger 822. Ball plunger 822 includes a ball 824 that slides within a bored cylinder 826 against pressure from a spring 828. When spring 828 is extended, ball 824 projects a distance from contact surface 810. As a mechanical latch striker 212 of docking system 200 makes contact with soft capture petal 442, mechanical latch striker 212 of docking system 200 pushes ball 824 into bored cylinder 826 and compresses spring 828. As soft capture petal 442 slides along mechanical latch striker 212 and ball plunger 822 reaches an edge of mechanical latch striker 212, ball 824 will again project from contact surface 810 and perform a soft capture of the mechanical latch striker 212.

Figure 9:
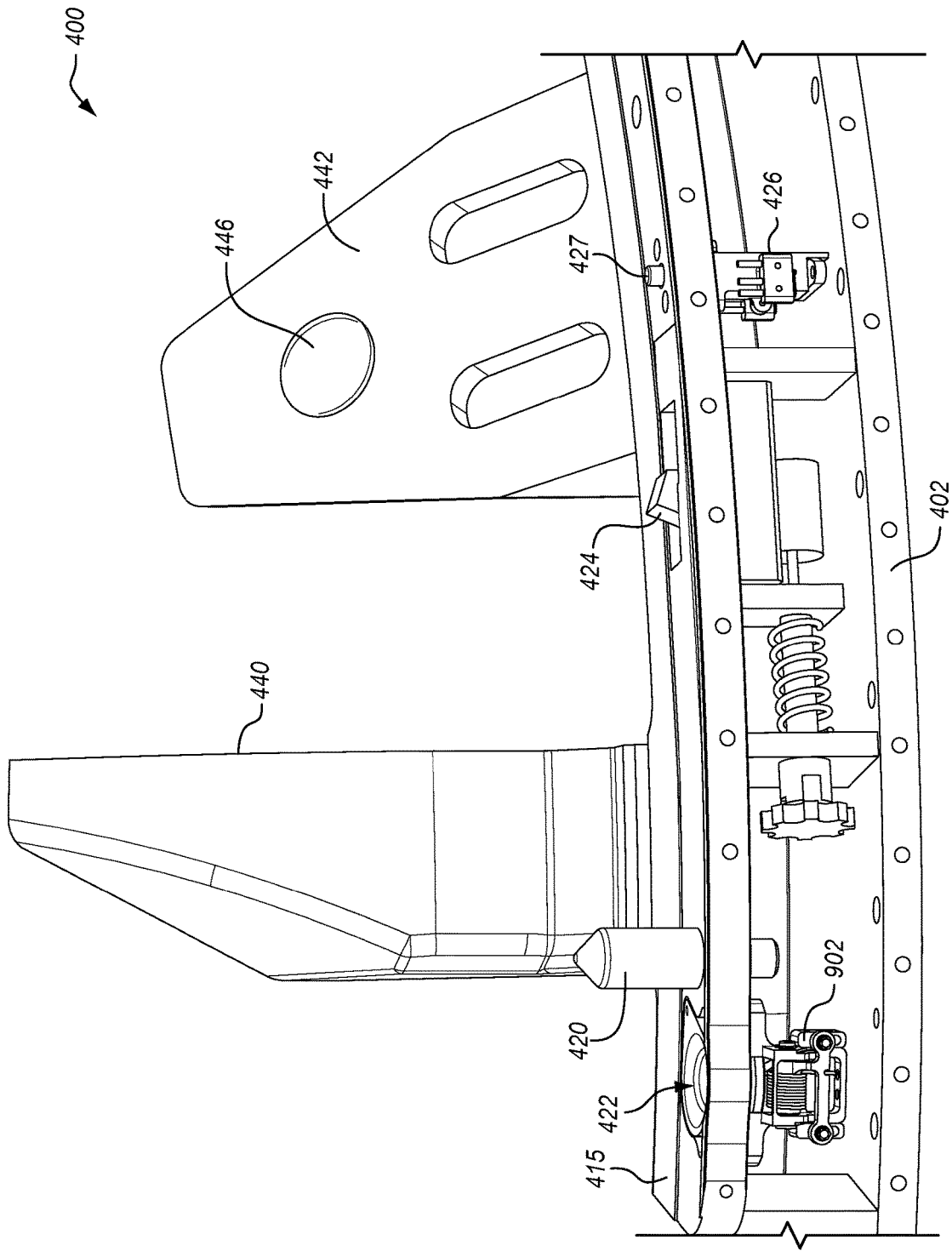
FIG. 9 is a magnified side view of a berthing system in an illustrative embodiment.

FIG. 9 is a magnified side view of berthing system 400 in an illustrative embodiment. This view further illustrates a hook engagement sensor 426 and hooks 424 that are disposed on interface surface 415. Sensor rod 427 of hook engagement sensor 426 projects axially from interface surface 415, and is configured to be compressed by force from an opposing interface surface 205 of docking system 200 (see FIG. 2). When sensor rod 427 is compressed, hook engagement sensor 426 generates a signal or indicator that hook 424 is engaged with a corresponding hook 218 on docking system 200.

This view also shows a guide pin receptacle 422 that is recessed from interface surface 415. When berthing system 400 is mated with docking system 200, a guide pin 214 of docking system 200 will engage guide pin receptacle 422 of berthing system 400. An unberthing complete sensor 902 is disposed at guide pin receptacle 422 (and other guide pin receptacles 422), and the guide pin 214 of docking system 200 contacts or engages unberthing complete sensor 902 when berthing system 400 is mated with docking system 200. When berthing system 400 is unberthed from docking system 200, the guide pin 214 of docking system 200 will disengage from unberthing complete sensor 902 and guide pin receptacle 422. Thus, unberthing complete sensor 902 is configured to indicate when the guide pin 214 disengages from the guide pin receptacle 422. Each guide pin receptacle 422 may have an unberthing complete sensor 902 as shown in FIG. 9.

Figure 10:
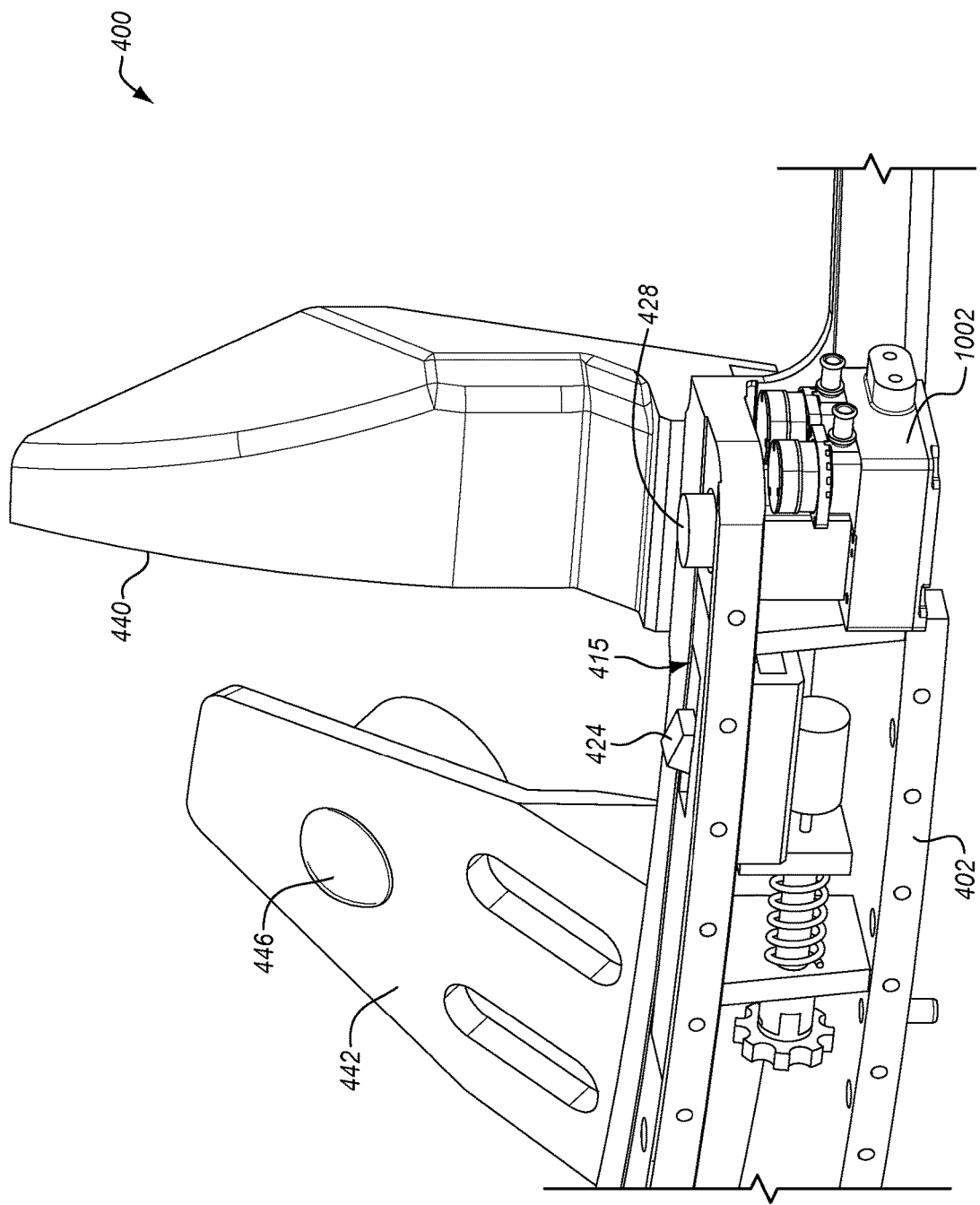
FIG. 10 is another magnified side view of a berthing system in an illustrative embodiment.

FIG. 10 is another magnified side view of berthing system 400 in an illustrative embodiment. This view further illustrates a preload member 428 disposed on interface surface 415. Preload member 428 is configured to extend and retract axially based on actuation from an actuator 1002. When extended, preload member 428 projects axially a distance from interface surface 415. When retracted, preload member 428 may be recessed below interface surface 415 or flush with interface surface 415. Actuator 1002 may comprise a clutch-driven electric motor, a pneumatic motor, a hydraulic motor, etc., that is configured to move preload member 428 in the axial direction 502.

Figure 11:
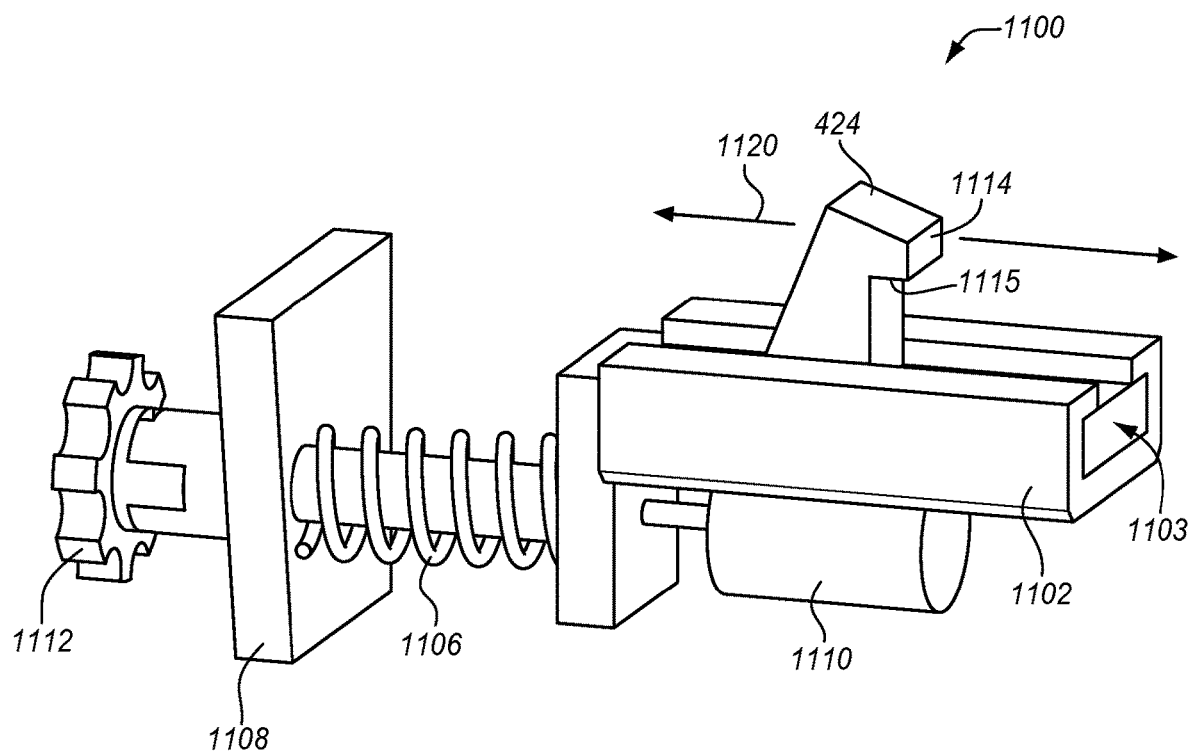
FIG. 11 is a perspective view of a hook assembly in an illustrative embodiment.

FIG. 11 is a perspective view of a hook assembly 1100 in an illustrative embodiment. Hook assembly 1100 includes a housing 1102, hook 424, and an elastic member 1106. Housing 1102 is configured to attach to tunnel 402, such as to outer peripheral surface 406. For example, housing 1102 may be welded, bolted, or otherwise affixed to tunnel 402. Hook 424 is slidably coupled to housing 1102 so that hook 424 may slide with respect to housing 1102 and tunnel 402 in a tangential direction 1120, and may therefore be referred to as a sliding hook. Looking at FIG. 4, the tangential direction 1120 is tangential to the circumference of interface surface 415. Housing 1102 includes an elongated slot 1103, and hook 424 is disposed within elongated slot 1103 in a slidable manner. Hook 424 has a leading edge 1114 and a catch end 1115, which includes curved or angled surfaces configured to engage a corresponding hook 218 on docking system 200. In one embodiment, the size and dimensions of hook 424 or catch end 1115 may be defined to engage a passive hook on docking system 200 as defined by IDSS. In another embodiment, the size and dimensions of hook 424 or catch end 1115 may be defined to engage an active hook on docking system 200 as defined by IDSS. Elastic member 1106, such as a spring, is disposed between hook 424 and a rib 1108 of tunnel 402. Elastic member 1106 is configured to apply a force on hook 424 in a first tangential direction 1120 (i.e., to the right in FIG. 11). Elastic member 1106 therefore keeps hook 424 in a closed position, which is to the right in FIG. 11.

Figure 12:
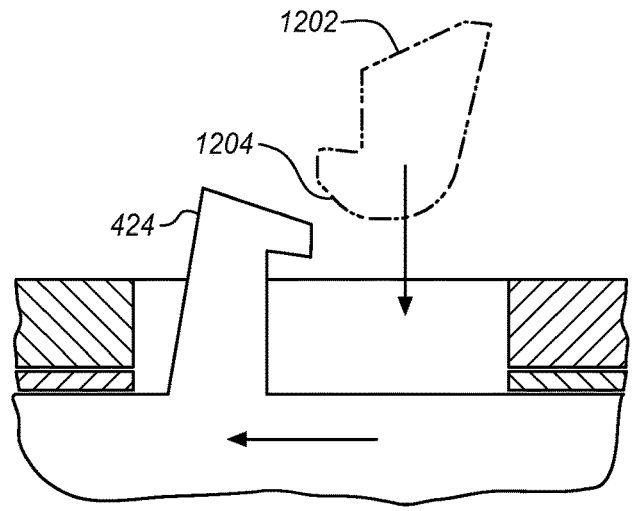
FIGS. 12-14 are cross-sectional views of a hook in illustrative embodiments.
Figure 13:
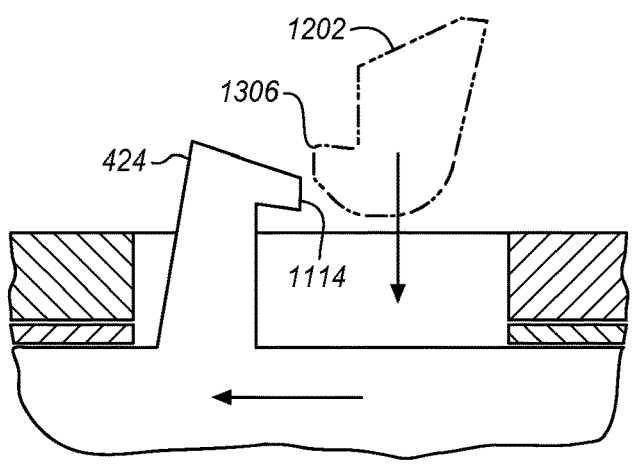
Figure 14:
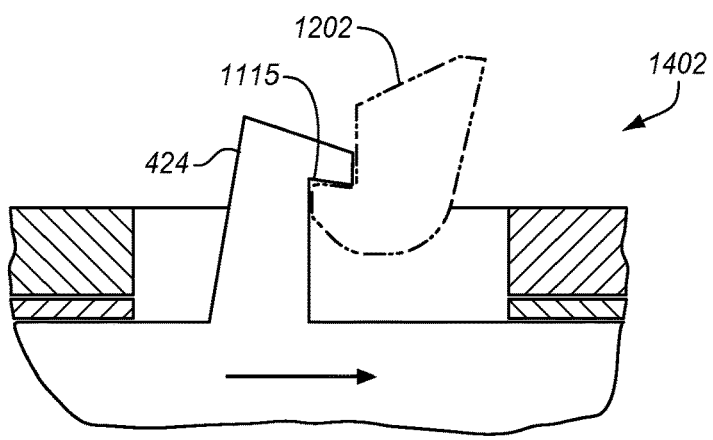

Due to the configuration of hook assembly 1100, hook 424 is configured to automatically engage with a corresponding hook 218 on docking system 200. FIGS. 12-14 are cross-sectional views of hook 424 in illustrative embodiments. These figures illustrate a hook engagement between hook 424 and a passive hook 1202 of docking system 200 (which may be one example of hooks 218 as shown in FIG. 2). It is assumed for this embodiment that berthing system 400 is adjacent to docking system 200, and is being moved toward docking system 200. Thus, passive hook 1202 of docking system 200 is moving downward in FIG. 12. In FIG. 12, hook 424 is initially in a closed position. As passive hook 1202 moves downward and the head 1204 of passive hook 1202 contacts hook 424, and force from passive hook 1202 overcomes the force applied by elastic member 1106 and slides hook 424 to the left as shown in FIG. 13 to an open position. As passive hook 1202 continues to move downward, the leading edge 1306 of passive hook 1202 slides past the leading edge 1114 of hook 424 as shown in FIG. 14. Hook 424 slides to the right due to force from elastic member 1106 back to the closed position, and the catch end 1115 of hook 424 engages passive hook 1202. Thus, a hook engagement 1402 is formed between hook 424 and passive hook 1202.

In FIG. 11, hook assembly 1100 may further include an actuator 1110 configured to apply a force on hook 424 in a second tangential direction 1120 (i.e., to the left in FIG. 11). The force applied by actuator 1110 is greater than the force applied by elastic member 1106 so that hook 424 slides tangentially (i.e., to the left in FIG. 11) to the open position. Actuator 1110 may be implemented to disengage hook 424 from a corresponding hook 218 of docking system 200 (e.g., passive hook 1202). Actuator 1110 may comprise a thermal actuator, which is a mechanical device that generates motion by thermal expansion. Hook assembly 1100 may further include a hand release knob 1112 coupled to hook 424, and configured to move hook 424 in the second tangential direction 1120. Hand release knob 1112 is an Extravehicular activity (EVA) device that may be accessed by a crew member to manually disengage hook 424 from a corresponding hook 218 of docking system 200.

Berthing system 400 provides technical benefits in that a system designed around berthing has reduced weight as compared to an active docking system. Berthing system 400 also has reduced complexity because an active SCS is not needed, which may improve reliability, and avoid the need for avionics to perform docking operations. This means that berthing system 400 may be installed on a wider range of spacecraft. Berthing system 400 may also provide an increased passageway diameter, which allows for an increased cargo transfer capability.

The following describes an example of a berthing operation using berthing system 400. FIG. 15 is a block diagram of a target spacecraft 1510 and a visiting spacecraft 1520 in an illustrative embodiment. Target spacecraft 1510 may comprise the ISS 100 as shown in FIG. 1, or another spacecraft having a docking system 200. As described above, docking system 200 includes tunnel 202, guide petals 210, mechanical latch strikers 212, guide pins 214, guide pin receptacles 216, hooks 218, PDTU 220, etc. Target spacecraft 1510 also includes a manipulator 1514, which comprises a robot arm configured to assist in berthing operations and other operations. Some examples of manipulator 1514 are SSRMS and Special Purpose Dexterous Manipulator (SPDM). Visiting spacecraft 1520 is a spacecraft that docks with target spacecraft 1510. Visiting spacecraft 1520 includes berthing system 400 as described above. Berthing system 400 includes tunnel 402, hooks 424, guide pins 420, guide pin receptacles 422, hook engagement sensors 426, preload members 428, resource umbilicals 450, guide petals 440, soft capture petals 442, etc.

Figure 16:
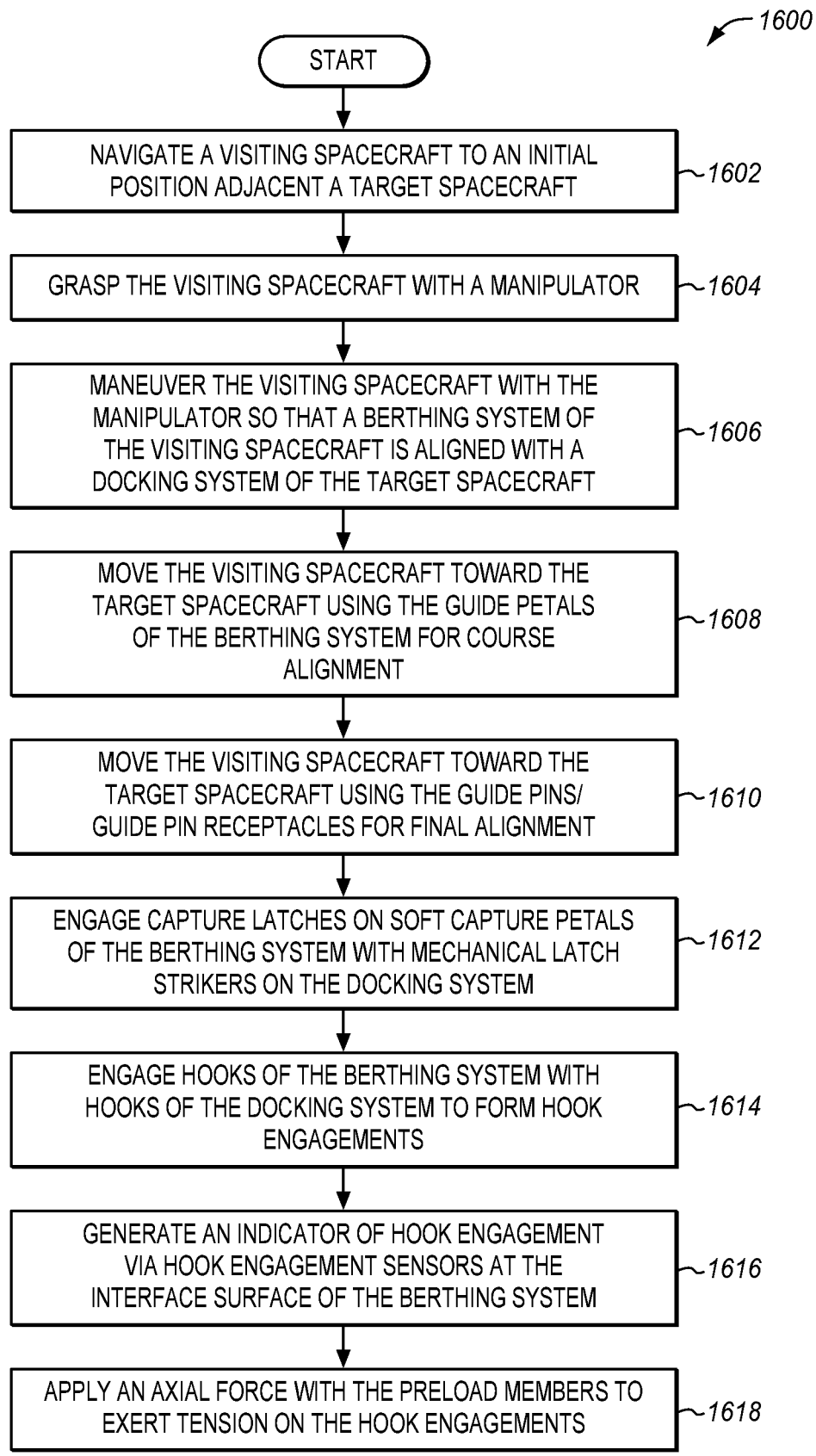
FIG. 16 is a flow chart illustrating a method of performing a berthing operation of a visiting spacecraft in an illustrative embodiment.

FIG. 16 is a flow chart illustrating a method 1600 of performing a berthing operation of visiting spacecraft 1520 in an illustrative embodiment. The steps of method 1600 will be described with respect to visiting spacecraft 1520 and target spacecraft 1510 of FIG. 15, although one skilled in the art will understand that the methods described herein may be performed on other types of spacecraft. The steps of the methods described herein are not all inclusive and may include other steps not shown. The steps for the flow charts shown herein may also be performed in an alternative order.

Figure 17:
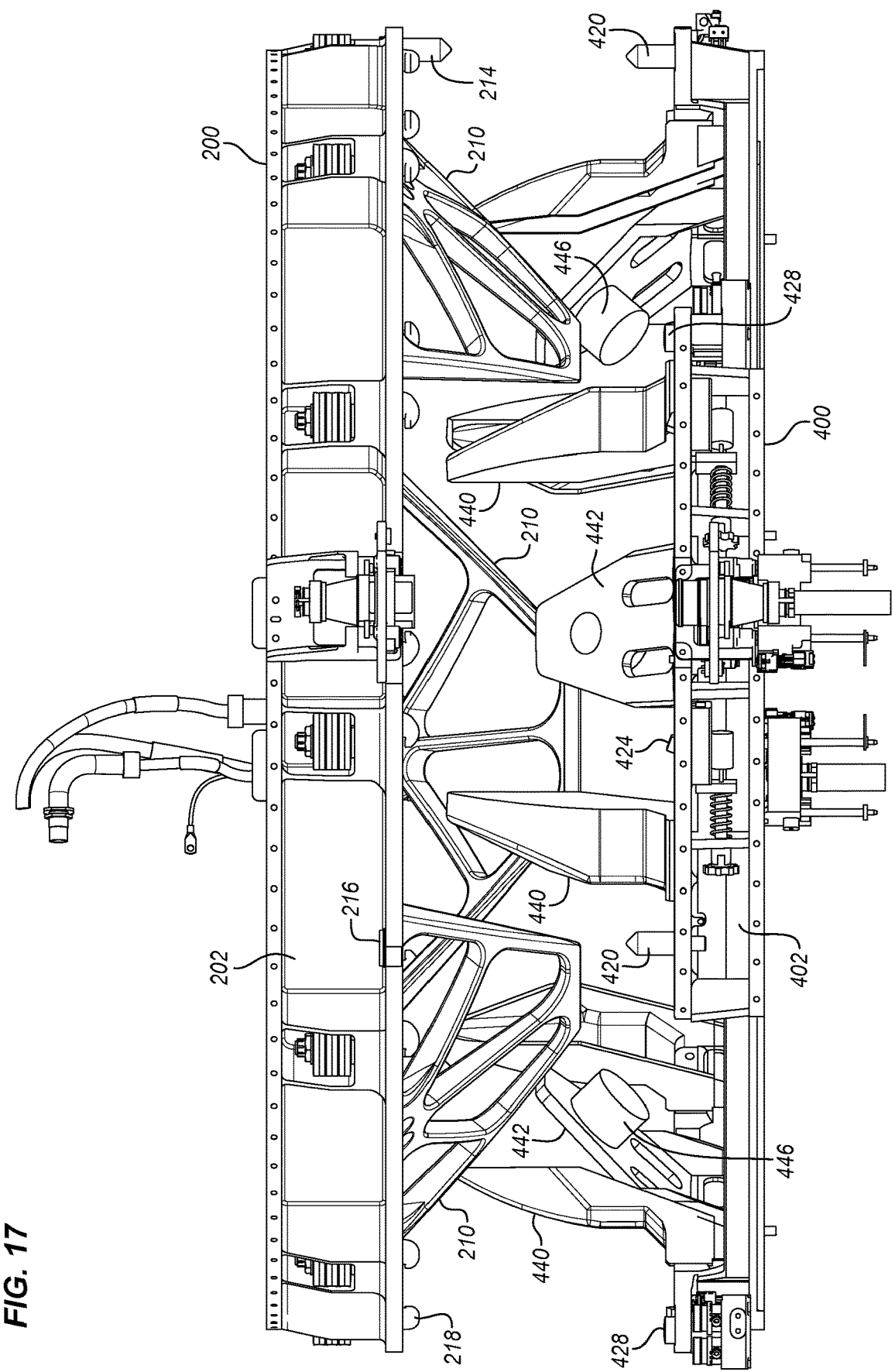
FIG. 17 is a side view of a berthing system aligned with a docking system of a target spacecraft in an illustrative embodiment.

The berthing operation as described below may be referred to as a manipulator-assisted berthing operation. Visiting spacecraft 1520 navigates to an initial position or meeting point adjacent to target spacecraft 1510 (step 1602). Manipulator 1514 of target spacecraft 1510 grasps visiting spacecraft 1520 (step 1604), and maneuvers visiting spacecraft 1520 so that berthing system 400 is aligned with docking system 200 of target spacecraft 1510 (step 1606). FIG. 17 is a side view of berthing system 400 aligned with docking system 200 of target spacecraft 1510 in an illustrative embodiment. In FIG. 16, manipulator 1514 moves visiting spacecraft 1520 toward target spacecraft 1510 using guide petals 440 for course alignment (step 1608). For course alignment, guide petals 440 contact docking system 200 of target spacecraft 1510 and slide along docking system 200. Manipulator 1514 continues to move visiting spacecraft 1520 toward target spacecraft 1510 using guide pins/guide pin receptacles for final alignment (step 1610). For final alignment, guide pins 420 on berthing system 400 engage guide pin receptacles 216 on docking system 200, and guide pins 214 on docking system 200 engage guide pin receptacles 422 on berthing system 400.

Figure 18:
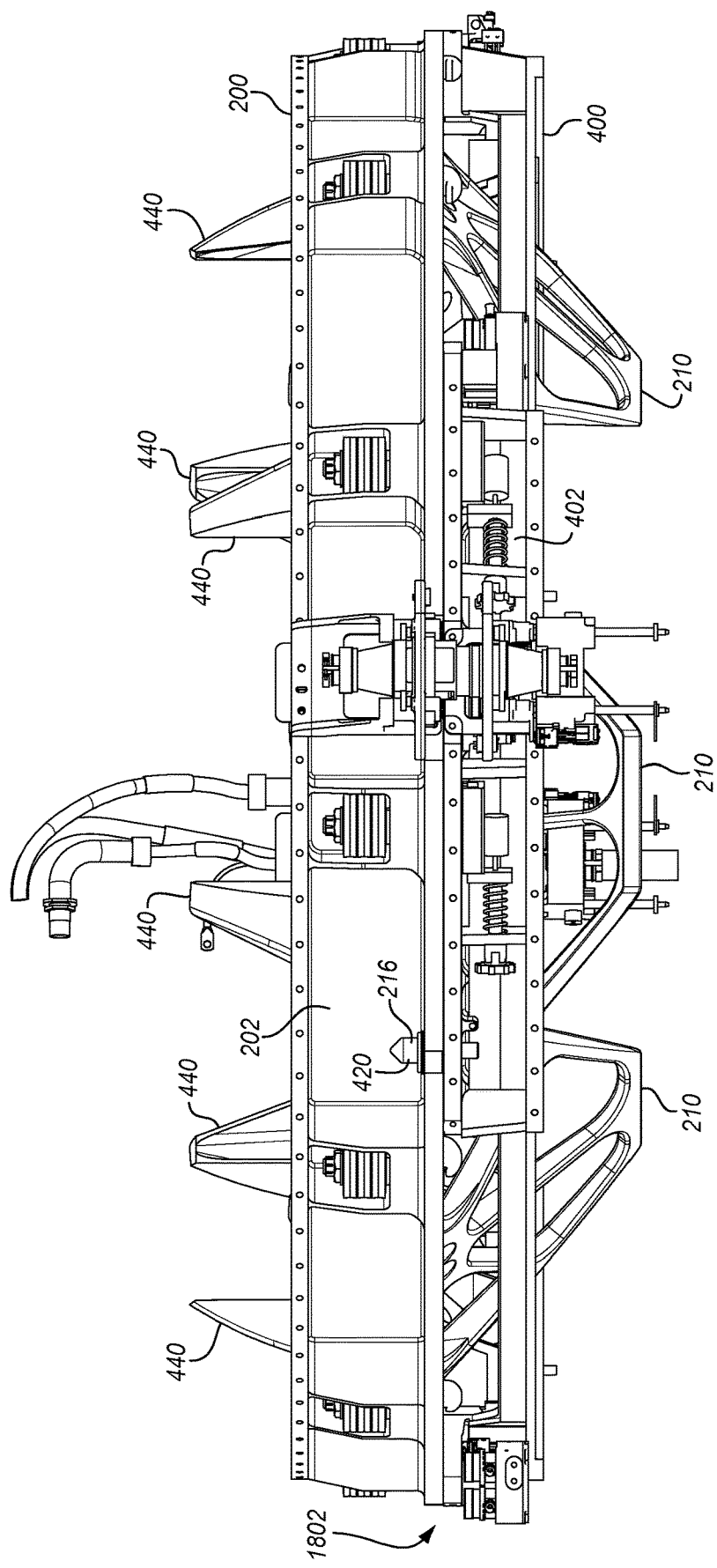
FIG. 18 is a side view of a berthing system at a mating position with a docking system in an illustrative embodiment.
Figure 19:
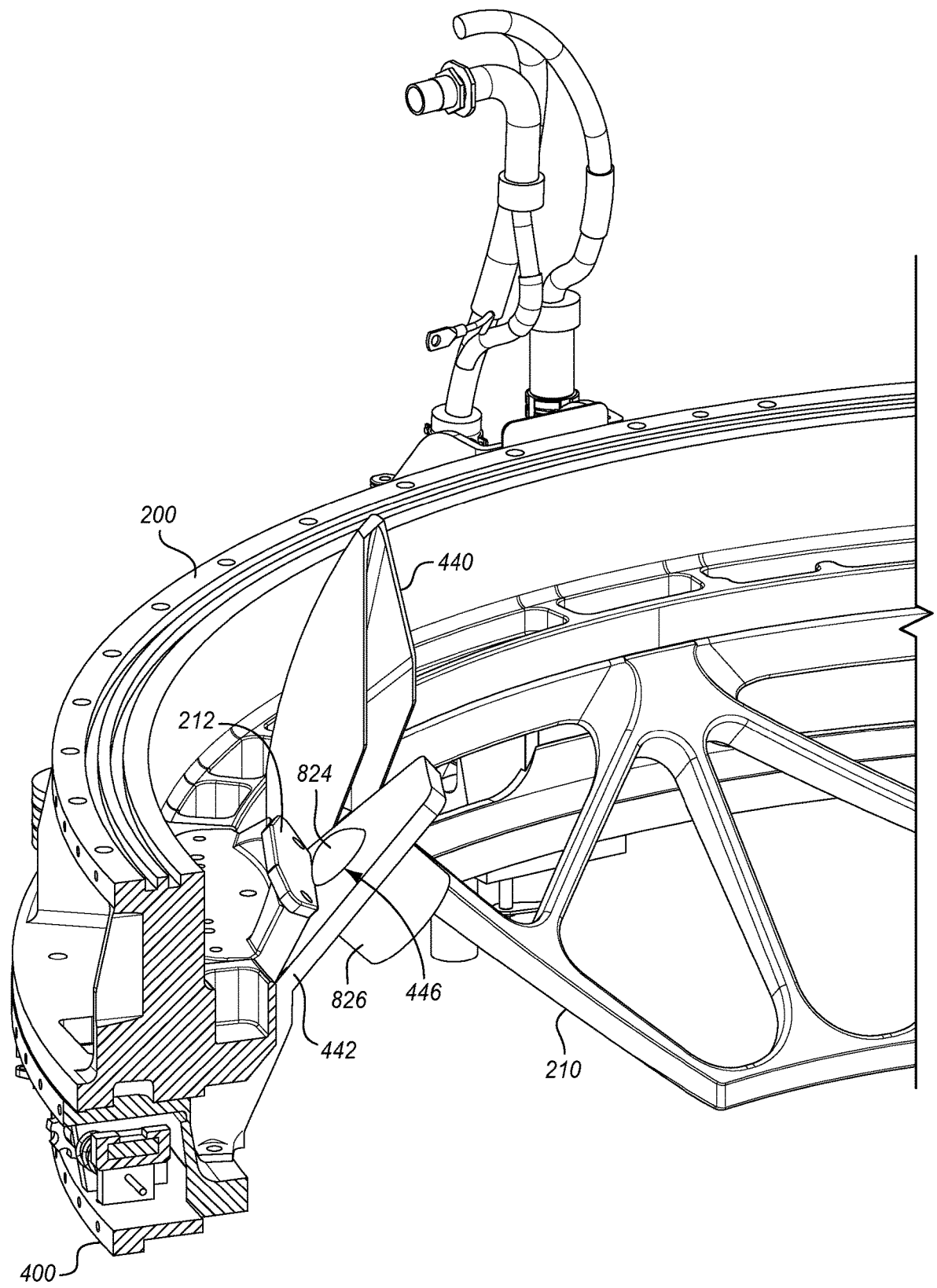
FIG. 19 is a magnified cross-sectional view of a capture latch on a soft capture petal engaging a mechanical latch striker in an illustrative embodiment.

Manipulator 1514 continues to move visiting spacecraft 1520 toward target spacecraft 1510 using the final alignment guides (i.e., guide pins/guide pin receptacles) to a mating position where interface surface 415 of berthing system 400 contacts or nearly contacts a corresponding interface surface 205 of docking system 200. The mating position may also be referred to as a soft capture position. FIG. 18 is a side view of a berthing system 400 at a mating position 1802 with docking system 200 in an illustrative embodiment. At or near the mating position 1802, capture latches 446 on soft capture petals 442 engage mechanical latch strikers 212 on docking system 200 (step 1612). FIG. 19 is a magnified cross-sectional view of a capture latch 446 on a soft capture petal 442 engaging a mechanical latch striker 212 in an illustrative embodiment. In this embodiment, capture latch 446 comprises a ball plunger 822 (see FIG. 8). As mechanical latch striker 212 of docking system 200 makes contact with soft capture petal 442, mechanical latch striker 212 pushes ball 824 into bored cylinder 826 and compresses the spring 828 (not visible). As soft capture petal 442 slides along mechanical latch striker 212 and ball plunger 822 reaches an edge of mechanical latch striker 212, ball 824 will again project from contact surface 810 and engage mechanical latch striker 212.

At or near the mating position 1802, hooks 424 of berthing system 400 engage hooks 218 of docking system 200 to form hook engagements 1402 (step 1614). As described above in FIGS. 12-14, hooks 424 of berthing system 400 slide tangentially and automatically engage hooks 218 of docking system 200 based on the spring-loaded action of hooks 424 to form a hook engagement 1402. Hook engagement sensors 426 also generate an indicator of hook engagement 1402 (step 1616). At or near the mating position 1802, interface surface 205 of docking system 200 compresses sensor rod 427 that projects axially from interface surface 415. Because of the automatic engagement of hooks 424 at or near the mating position 1802, hook engagement sensors 426 generate a signal or indicator when sensor rod 427 is compressed due to contact with docking system 200 to indicate that hooks 424 are engaged with corresponding hooks 218 on docking system 200. With hooks 424 engaged, manipulator 1514 may transition to "limp mode".

In response to the hook engagement indicator, preload members 428 apply an axial force against docking system 200 to exert tension on the hook engagements 1402 (step 1618). For example, actuators 1002 (see FIG. 10) may extend preload members 428 axially from interface surface 415 to make contact with interface surface 205 of docking system 200. This applies an axial force that acts to separate berthing system 400 and docking system 200, and create tension between hooks 424 on berthing system 400 and hooks 218 on docking system 200 to support the hook engagements 1402. There may be other functions that are performed for a berthing operation that are not discussed for the sake of brevity, such as engaging resource umbilicals 450 with PDTUs 220 on docking system 200, disconnecting manipulator 1514 from visiting spacecraft 1520, etc.

The berthing operation described above performs a soft capture, such as when capture latches 446 on soft capture petals 442 engage mechanical latch strikers 212 on docking system 200 and/or when hooks 424 on berthing system 400 engage hooks 218 on docking system 200. Although there is structural latching, there is no sealing in this embodiment. Thus, hard capture features are not needed for berthing system 400, and hard capture operations do not need to be performed. This makes berthing system 400 lighter and cheaper, and also makes the berthing operation easier to perform.

Figure 20:
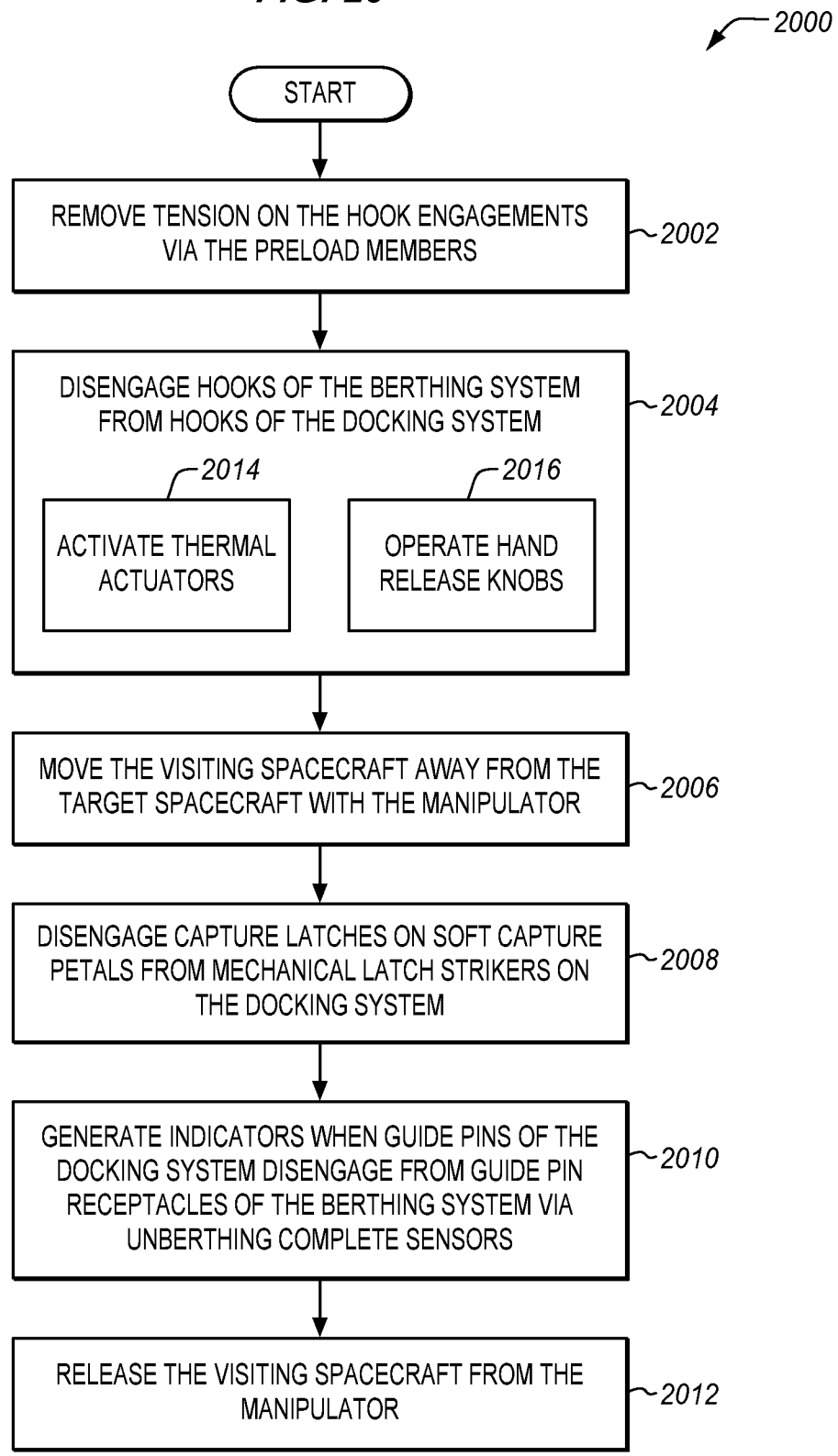
FIG. 20 is a flow chart illustrating a method of performing an unberthing operation of a visiting spacecraft in an illustrative embodiment.

FIG. 20 is a flow chart illustrating a method 2000 of performing an unberthing operation of visiting spacecraft 1520 in an illustrative embodiment. The unberthing operation as described below may be referred to as a manipulator-assisted unberthing operation. It is assumed for this embodiment that manipulator 1514 of target spacecraft 1510 has grasped visiting spacecraft 1520 for the berthing operation as described above. To unberth, preload members 428 remove tension on the hook engagements 1402 (step 2002). For example, clutch-driven electric motors 1552 may comprise a type of actuator 1002 that retracts preload members 428 to disengage from interface surface 205 of docking system 200. This removes the axial force that added tension between hooks 424 on berthing system 400 and hooks 218 on docking system 200. Hooks 424 of berthing system 400 are then disengaged from hooks 218 of docking system 200 (step 2004). For step 2004, thermal actuators 1550 may be activated to slide hooks 424 tangentially, and disengage hooks 424 from hooks 218 of docking system 200 (step 2014). Alternatively or additionally, hand release knobs 1112 may be operated by a crew member to slide hooks 424 tangentially, and disengage hooks 424 from hooks 218 of docking system 200 (step 2016).

With hooks 424 disengaged, manipulator 1514 moves visiting spacecraft 1520 away from target spacecraft 1510 (step 2006). As manipulator 1514 moves visiting spacecraft 1520 away from target spacecraft 1510, capture latches 446 on soft capture petals 442 disengage from mechanical latch strikers 212 of docking system 200 (step 2008). Further moving of visiting spacecraft 1520 away from target spacecraft 1510 causes guide pins 420 on berthing system 400 to disengage from guide pin receptacles 216 on docking system 200, and guide pins 214 on docking system 200 to disengage from guide pin receptacles 422 on berthing system 400. Unberthing complete sensors 902 generate indicators when the guide pins 214 disengage from the guide pin receptacles 422 (step 2010). When visiting spacecraft 1520 is moved a distance from target spacecraft 1510, manipulator 1514 releases the visiting spacecraft 1520 (step 2012). Docking system 200 is then available for another visiting spacecraft to perform a berthing or docking operation. There may be other functions that are performed for an unberthing operation that are not discussed for the sake of brevity.

Although specific embodiments were described herein, the scope is not limited to those specific embodiments. Rather, the scope is defined by the following claims and any equivalents thereof.

The invention claimed is:

1. A non-sealing berthing system for a visiting spacecraft, the non-sealing berthing system comprising:
   a tunnel having a first end configured to attach to the visiting spacecraft, and a second end that includes an interface surface that mates with a docking system of a target spacecraft;
   sliding hooks disposed circumferentially on the interface surface of the tunnel;
   preload members disposed circumferentially at the interface surface of the tunnel;

guide petals spaced around an inner peripheral surface of the tunnel, wherein the guide petals project in an axial direction beyond the interface surface and point radially inward; and soft capture petals spaced around the inner peripheral surface of the tunnel;

wherein the soft capture petals project in the axial direction beyond the interface surface and point radially inward;

wherein the soft capture petals include capture latches configured to engage mechanical latch strikers on the docking system of the target spacecraft;

wherein the preload members are configured to extend from the interface surface in the axial direction to apply an axial force to separate the non-sealing berthing system from the docking system.

2. The non-sealing berthing system of claim 1 wherein:
the capture latches comprise ball plungers.

3. The non-sealing berthing system of claim 2 wherein:
the soft capture petals include a contact surface that angles radially inward at 45 degrees, and one of the ball plungers is disposed on the contact surface.

4. The non-sealing berthing system of claim 1 further comprising:
guide pins that project in the axial direction from the interface surface of the tunnel; and
guide pin receptacles recessed in the axial direction from the interface surface.

5. The non-sealing berthing system of claim 4 further comprising:
unberthing complete sensors disposed at the guide pin receptacles, and configured to indicate when guide pins on the docking system of the target spacecraft disengage from the guide pin receptacles.

6. The non-sealing berthing system of claim 1 further comprising:
hook engagement sensors at the interface surface configured to indicate contact with the docking system of the target spacecraft.

7. The non-sealing berthing system of claim 1 further comprising:
clutch-loaded electric motors coupled to the preload members, and configured to move the preload members in the axial direction.

8. The non-sealing berthing system of claim 1 wherein the sliding hooks are part of a hook assembly comprising:
a housing mounted on the tunnel;
one of the sliding hooks that is slidably coupled to the housing; and
an elastic member configured to apply a force on the one of the sliding hooks in a first tangential direction with respect to the interface surface.

9. The non-sealing berthing system of claim 8 wherein the hook assembly further comprises:
a thermal actuator configured to apply a force on the one of the sliding hooks in a second tangential direction with respect to the interface surface.

10. The non-sealing berthing system of claim 8 wherein the hook assembly further comprises:
a hand release knob coupled to the one of the sliding hooks, and configured to move the one of the sliding hooks in a second tangential direction.

11. The non-sealing berthing system of claim 1 wherein:
a pair of the guide petals and one of the soft capture petals are mounted within groupings along the inner peripheral surface of the tunnel, with the one of the soft capture petals interposed between the pair of the guide petals at each of the groupings.

12. A non-sealing berthing system for a visiting spacecraft, the non-sealing berthing system comprising:
a tunnel having a first end configured to attach to the visiting spacecraft, and a second end that includes an interface surface that mates with a docking system of a target spacecraft;
guide pins that project axially from the interface surface of the tunnel;
guide pin receptacles recessed from the interface surface;
soft capture petals spaced equally around an inner peripheral surface of the tunnel, and that project axially beyond the interface surface and point radially inward;
guide petals spaced around the inner peripheral surface of the tunnel, wherein the soft capture petals are each disposed between a pair of the guide petals;
sliding hooks disposed circumferentially on the interface surface of the tunnel, and configured to engage passive hooks on the docking system of the target spacecraft to form hook engagements; and
preload members disposed circumferentially at the interface surface of the tunnel, and configured to extend axially from the interface surface to apply an axial force to separate the non-sealing berthing system from the docking system of the target spacecraft and exert tension on the hook engagements;
wherein the soft capture petals include capture latches configured to engage mechanical latch strikers on the docking system of the target spacecraft.

13. The non-sealing berthing system of claim 12 wherein:
the capture latches comprise ball plungers.

14. The non-sealing berthing system of claim 12 further comprising:
clutch-loaded electric motors coupled to the preload members, and configured to extend the preload members axially.

15. The non-sealing berthing system of claim 12 wherein the sliding hooks are part of a hook assembly comprising:
a housing mounted on the tunnel;
one of the sliding hooks that is slidably coupled to the housing;
an elastic member configured to apply a force on the one of the sliding hooks in a first tangential direction with respect to the interface surface; and
a thermal actuator configured to apply a force on the one of the sliding hooks in a second tangential direction with respect to the interface surface.

16. The non-sealing berthing system of claim 15 wherein the hook assembly further comprises:
a hand release knob coupled to the one of the sliding hooks, and configured to move the one of the sliding hooks in a second tangential direction.

17. A method for berthing a visiting spacecraft, the method comprising:
navigating the visiting spacecraft to an initial position adjacent to a target spacecraft;
grasping the visiting spacecraft with a manipulator on the target spacecraft;
maneuvering the visiting spacecraft with the manipulator so that a non-sealing berthing system of the visiting spacecraft is aligned with a docking system of the target spacecraft, wherein the non-sealing berthing system comprises:

a tunnel having a first end configured to attach to the visiting spacecraft, and a second end that includes an interface surface that mates with the docking system of the target spacecraft;

preload members disposed circumferentially at the interface surface of the tunnel;

guide petals spaced around an inner peripheral surface of the tunnel, wherein the guide petals project in the axial direction beyond the interface surface and point radially inward; and soft capture petals spaced around the inner peripheral surface of the tunnel, wherein the soft capture petals project in the axial direction beyond the interface surface and point radially inward;

moving the visiting spacecraft with the manipulator toward the target spacecraft using the guide petals for course alignment;

moving the visiting spacecraft with the manipulator toward the target spacecraft to a mating position using guide pins and guide pin receptacles for final alignment;

engaging capture latches on the soft capture petals system with mechanical latch strikers on the docking system of the target spacecraft at the mating position;

engaging sliding hooks disposed circumferentially on the interface surface of the tunnel with hooks on the docking system of the target spacecraft to form hook engagements at the mating position;

generating an indicator of the hook engagements via hook engagement sensors at the interface surface of the tunnel; and applying an axial force with the preload members by extending the preload members from the interface surface in the axial direction to separate the non-sealing berthing system from the docking system to exert tension on the hook engagements in response to the indicator.

18. The method of claim 17, wherein unberthing the visiting spacecraft comprises:

removing the tension on the hook engagements via the preload members;

disengaging the sliding hooks from the hooks on the docking system of the target spacecraft;

moving the visiting spacecraft away from the target spacecraft with the manipulator;

disengaging the capture latches on the soft capture petals from the mechanical latch strikers on the docking system due to movement of the visiting spacecraft;

generating indicators when guide pins on the docking system of the target spacecraft disengage from the guide pin receptacles on the non-sealing berthing system; and releasing the visiting spacecraft from the manipulator.

19. The method of claim 18, wherein disengaging the sliding hooks from the hooks on the docking system of the target spacecraft comprises:

activating thermal actuators to slide the sliding hooks and disengage the sliding hooks from the hooks on the docking system of the target spacecraft.

20. The method of claim 18, wherein disengaging the sliding hooks from the hooks on the docking system of the target spacecraft comprises:

operating hand release knobs to slide the sliding hooks and disengage the sliding hooks from the hooks on the docking system of the target spacecraft.

* * * * *